United States Patent
Sadeghi et al.

(10) Patent No.: US 12,052,742 B2
(45) Date of Patent: Jul. 30, 2024

(54) CLUSTERING IN MULTIPLE-INPUT MULTIPLE-OUTPUT COMMUNICATION SYSTEMS

(71) Applicant: Virewirx, Inc., San Diego, CA (US)

(72) Inventors: Masoumeh Sadeghi, San Diego, CA (US); Wanlu Sun, San Diego, CA (US); Siddhartha Mallik, San Diego, CA (US); Anthony Edet Ekpenyong, San Diego, CA (US); Jing Jiang, San Diego, CA (US); Tamer Adel Kadous, San Diego, CA (US)

(73) Assignee: Virewirx, Inc., San Diego, CA (US)

( * ) Notice: Subject to any disclaimer, the term of this patent is extended or adjusted under 35 U.S.C. 154(b) by 31 days.

(21) Appl. No.: 17/452,664

(22) Filed: Oct. 28, 2021

(65) Prior Publication Data
US 2022/0141843 A1 May 5, 2022

Related U.S. Application Data

(60) Provisional application No. 63/108,170, filed on Oct. 30, 2020.

(51) Int. Cl.
*H04W 72/542* (2023.01)
*H04B 7/0413* (2017.01)
(Continued)

(52) U.S. Cl.
CPC ........ *H04W 72/542* (2023.01); *H04B 7/0456* (2013.01); *H04L 1/0003* (2013.01);
(Continued)

(58) Field of Classification Search
CPC ............. H04W 72/542; H04W 72/541; H04W 72/566; H04W 28/06; H04B 7/0456; H04B 7/0413; H04L 1/0003; H04L 25/0228
(Continued)

(56) References Cited

U.S. PATENT DOCUMENTS 6,636,568 B2  10/2003  Kadous
6,801,580 B2  10/2004  Kadous
(Continued)

FOREIGN PATENT DOCUMENTS

CN      101742597 A  *  6/2010

OTHER PUBLICATIONS

International Search Report for International Application No. PCT/US2021/056892 dated Mar. 21, 2022, 5 pages.
(Continued)

*Primary Examiner* — Xuan Lu
(74) *Attorney, Agent, or Firm* — Knobbe, Martens, Olson & Bear, LLP

(57) ABSTRACT

Aspects of this disclosure relate to forming clusters of user equipments and network nodes. A first cluster of first user equipments and first network nodes in a first section can be formed for a time slot. A second cluster of second user equipments and second network nodes in a second section can be formed for the time slot such that the first user equipments are protected from interference associated with the second cluster. During the time slot, the first section has higher priority than the second section. Multiple-input multiple-output wireless communications can occur during the time slot (a) from the first network nodes to the first user equipments and (b) from the second network nodes to the second user equipments.

22 Claims, 16 Drawing Sheets

(51) Int. Cl.
  *H04B 7/0452* (2017.01)
  *H04B 7/0456* (2017.01)
  *H04L 1/00* (2006.01)
  *H04L 25/02* (2006.01)
  *H04W 28/06* (2009.01)
  *H04W 72/12* (2023.01)
  *H04W 72/541* (2023.01)
  *H04W 72/566* (2023.01)

(52) U.S. Cl.
  CPC ......... *H04L 25/0228* (2013.01); *H04W 28/06* (2013.01); *H04W 72/541* (2023.01); *H04W 72/566* (2023.01); *H04B 7/0413* (2013.01)

(58) Field of Classification Search
  USPC ........................................................ 370/329
  See application file for complete search history.

(56) References Cited

U.S. PATENT DOCUMENTS

| | | |
|---|---|---|
| 6,873,606 B2 | 3/2005 | Agrawal |
| 6,917,821 B2 | 7/2005 | Kadous |
| 6,928,062 B2 | 8/2005 | Krishnan |
| 7,012,883 B2 | 3/2006 | Jalali |
| 7,020,073 B2 | 3/2006 | Kadous |
| 7,039,001 B2 | 5/2006 | Krishnan |
| 7,042,857 B2 | 5/2006 | Krishnan |
| 7,095,790 B2 | 8/2006 | Krishnan |
| 7,145,940 B2 | 12/2006 | Gore |
| 7,167,684 B2 | 1/2007 | Kadous |
| 7,177,351 B2 | 2/2007 | Kadous |
| 7,184,713 B2 | 2/2007 | Kadous |
| 7,194,041 B2 | 3/2007 | Kadous |
| 7,236,535 B2 | 6/2007 | Subramaniam |
| 7,418,046 B2 | 8/2008 | Gore |
| 7,428,269 B2 | 9/2008 | Sampath |
| 7,457,639 B2 | 11/2008 | Subramaniam |
| 7,463,576 B2 | 12/2008 | Krishnan |
| 7,477,693 B2 | 1/2009 | Subramaniam |
| 7,508,748 B2 | 3/2009 | Kadous |
| 7,567,621 B2 | 7/2009 | Sampath |
| 7,606,326 B2 | 10/2009 | Krishnan |
| 7,668,125 B2 | 2/2010 | Kadous |
| 7,675,886 B2 | 3/2010 | Agrawal |
| 7,725,799 B2 | 5/2010 | Walker |
| 7,890,144 B2 | 2/2011 | Subramaniam |
| 7,903,615 B2 | 3/2011 | Gorokhov |
| 7,940,663 B2 | 5/2011 | Kadous |
| 7,948,959 B2 | 5/2011 | Wang |
| 7,974,359 B2 | 7/2011 | Gorokhov |
| 8,014,331 B2 | 9/2011 | Sarkar |
| 8,073,068 B2 | 12/2011 | Kim |
| 8,077,654 B2 | 12/2011 | Sutivong |
| 8,077,691 B2 | 12/2011 | Kadous |
| 8,098,635 B2 | 1/2012 | Montojo |
| 8,107,517 B2 | 1/2012 | Naguib |
| 8,139,672 B2 | 3/2012 | Gore |
| 8,204,470 B2 | 6/2012 | Onggosanusi et al. |
| 8,204,530 B2 | 6/2012 | Gorokhov |
| 8,229,423 B2 | 7/2012 | Sarkar |
| 8,250,428 B2 | 8/2012 | Sun |
| 8,259,637 B2 | 9/2012 | Bertrand et al. |
| 8,305,965 B2 | 11/2012 | Shen et al. |
| 8,306,096 B2 | 11/2012 | Sampath |
| 8,331,310 B2 | 12/2012 | Wang |
| 8,331,892 B2 | 12/2012 | Kadous |
| 8,340,605 B2 | 12/2012 | Hou |
| 8,351,456 B2 | 1/2013 | Kadous |
| 8,379,705 B2 | 2/2013 | Mallik |
| 8,380,240 B2 | 2/2013 | Muharemovic et al. |
| 8,385,433 B2 | 2/2013 | Wang |
| 8,385,465 B2 | 2/2013 | Kadous |
| 8,391,196 B2 | 3/2013 | Gorokhov |
| 8,391,413 B2 | 3/2013 | Mantravadi |
| 8,432,821 B2 | 4/2013 | Gorokhov |
| 8,443,255 B2 | 5/2013 | Jiang |
| 8,451,740 B2 | 5/2013 | Sampath |
| 8,451,776 B2 | 5/2013 | Dayal |
| 8,457,152 B2 | 6/2013 | Gorokhov |
| 8,457,221 B2 | 6/2013 | Palanki |
| 8,462,859 B2 | 6/2013 | Sampath |
| 8,493,958 B2 | 7/2013 | Attar |
| 8,498,192 B2 | 7/2013 | Bhushan |
| 8,498,647 B2 | 7/2013 | Gorokhov |
| 8,514,738 B2 | 8/2013 | Chandrasekhar et al. |
| 8,526,347 B2 | 9/2013 | Wang |
| 8,576,742 B2 | 11/2013 | Yoo |
| 8,576,760 B2 | 11/2013 | Gorokhov |
| 8,588,801 B2 | 11/2013 | Gorokhov |
| 8,605,729 B2 | 12/2013 | Dayal |
| 8,605,839 B2 | 12/2013 | Jiang |
| 8,614,981 B2 | 12/2013 | Mallik |
| 8,619,717 B2 | 12/2013 | Agrawal |
| 8,634,435 B2 | 1/2014 | Kadous |
| 8,639,190 B2 | 1/2014 | Gore |
| 8,640,012 B2 | 1/2014 | Ling |
| 8,654,705 B2 | 2/2014 | Wang |
| 8,654,715 B2 | 2/2014 | Wang |
| 8,655,400 B2 | 2/2014 | Kadous |
| 8,675,511 B2 | 3/2014 | Gorokhov |
| 8,675,560 B2 | 3/2014 | Yoo |
| 8,676,209 B2 | 3/2014 | Gorokhov |
| 8,724,545 B2 | 5/2014 | Dayal |
| 8,724,555 B2 | 5/2014 | Krishnan |
| 8,737,470 B2 | 5/2014 | Walker |
| 8,760,994 B2 | 6/2014 | Wang |
| 8,761,062 B2 | 6/2014 | Chandrasekhar et al. |
| 8,767,641 B2 | 7/2014 | Chen et al. |
| 8,767,885 B2 | 7/2014 | Sampath |
| 8,781,005 B2 | 7/2014 | Mallik |
| 8,787,183 B2 | 7/2014 | Mallik |
| 8,812,657 B2 | 8/2014 | Mallik |
| 8,817,924 B2 | 8/2014 | Mallik |
| 8,825,860 B2 | 9/2014 | Linsky |
| 8,830,934 B2 | 9/2014 | Banister |
| 8,842,693 B2 | 9/2014 | Agrawal |
| 8,848,607 B2 | 9/2014 | Wang |
| 8,855,000 B2 | 10/2014 | Mallik |
| 8,855,001 B2 | 10/2014 | Gorokhov |
| 8,874,998 B2 | 10/2014 | Walker |
| 8,879,445 B2 | 11/2014 | Sadek |
| 8,885,744 B2 | 11/2014 | Kadous |
| 8,886,126 B2 | 11/2014 | Mantravadi |
| 8,886,239 B2 | 11/2014 | Dayal |
| 8,897,181 B2 | 11/2014 | Wang |
| 8,897,220 B2 | 11/2014 | Kadous |
| 8,903,021 B2 | 12/2014 | Mantravadi |
| 8,908,496 B2 | 12/2014 | Kadous |
| 8,923,109 B2 | 12/2014 | Wang |
| 8,923,208 B2 | 12/2014 | Dayal |
| 8,954,063 B2 | 2/2015 | Sarkar |
| 8,971,461 B2 | 3/2015 | Sampath |
| 8,971,823 B2 | 3/2015 | Gore |
| 8,976,662 B2 | 3/2015 | Somasundaram |
| 8,982,832 B2 | 3/2015 | Ling |
| 9,001,641 B2 | 4/2015 | Bertrand et al. |
| 9,001,756 B2 | 4/2015 | Chen et al. |
| 9,036,538 B2 | 5/2015 | Palanki |
| 9,071,315 B2 | 6/2015 | Huang |
| 9,084,242 B2 | 7/2015 | Chen et al. |
| 9,088,389 B2 | 7/2015 | Gorokhov |
| 9,106,287 B2 | 8/2015 | Wang |
| 9,107,056 B2 | 8/2015 | Damnjanovic |
| 9,113,488 B2 | 8/2015 | Oguz |
| 9,136,953 B2 | 9/2015 | Yoo |
| 9,136,974 B2 | 9/2015 | Gorokhov |
| 9,143,957 B2 | 9/2015 | Sadek |
| 9,144,036 B2 | 9/2015 | Gorokhov |
| 9,144,084 B2 | 9/2015 | Sadek |
| 9,148,256 B2 | 9/2015 | Sampath |
| 9,154,179 B2 | 10/2015 | Gudem |
| 9,154,211 B2 | 10/2015 | Sampath |
| 9,154,277 B2 | 10/2015 | Ekpenyong et al. |

(56) References Cited

U.S. PATENT DOCUMENTS

| | | |
|---|---|---|
| 9,155,106 B2 | 10/2015 | Krishnan |
| 9,161,232 B2 | 10/2015 | Linsky |
| 9,161,233 B2 | 10/2015 | Wang |
| 9,172,402 B2 | 10/2015 | Gudem |
| 9,172,453 B2 | 10/2015 | Wang |
| 9,179,319 B2 | 11/2015 | Gore |
| 9,184,870 B2 | 11/2015 | Sampath |
| 9,185,718 B2 | 11/2015 | Kadous |
| 9,185,720 B2 | 11/2015 | Mantravadi |
| 9,210,605 B2 | 12/2015 | Yoo |
| 9,226,173 B2 | 12/2015 | Sadek |
| 9,231,666 B2 | 1/2016 | Muharemovic et al. |
| 9,237,434 B2 | 1/2016 | Mallik |
| 9,246,560 B2 | 1/2016 | Sampath |
| 9,253,658 B2 | 2/2016 | Sadek |
| 9,264,183 B2 | 2/2016 | Gorokhov |
| 9,265,047 B2 | 2/2016 | Mallik |
| 9,270,441 B2 | 2/2016 | Mallik |
| 9,277,564 B2 | 3/2016 | Wang |
| 9,282,462 B2 | 3/2016 | Dayal |
| 9,307,544 B2 | 4/2016 | Gore |
| 9,319,928 B2 | 4/2016 | Bertrand et al. |
| 9,351,307 B2 | 5/2016 | Luo |
| 9,398,602 B2 | 7/2016 | Kadous |
| 9,401,748 B2 | 7/2016 | Chen et al. |
| 9,408,220 B2 | 8/2016 | Gore |
| 9,413,509 B2 | 8/2016 | Chen et al. |
| 9,451,480 B2 | 9/2016 | Huang |
| 9,461,736 B2 | 10/2016 | Bhushan |
| 9,473,219 B2 | 10/2016 | Muharemovic et al. |
| 9,474,051 B2 | 10/2016 | Wilson et al. |
| 9,474,075 B2 | 10/2016 | Yavuz |
| 9,485,069 B2 | 11/2016 | Wang |
| 9,497,765 B2 | 11/2016 | Yoo |
| 9,521,554 B2 | 12/2016 | Farajidana |
| 9,532,230 B2 | 12/2016 | Bendlin et al. |
| 9,571,250 B2 | 2/2017 | Chen et al. |
| 9,578,649 B2 | 2/2017 | Dayal |
| 9,585,156 B2 | 2/2017 | Bhattad |
| 9,603,040 B2 | 3/2017 | Chandrasekhar et al. |
| 9,603,141 B2 | 3/2017 | Chen et al. |
| 9,628,311 B2 | 4/2017 | Bertrand et al. |
| 9,660,776 B2 | 5/2017 | Kadous |
| 9,667,397 B2 | 5/2017 | Chen et al. |
| 9,673,948 B2 | 6/2017 | Jiang |
| 9,680,522 B2 | 6/2017 | Ekpenyong et al. |
| 9,693,323 B2 | 6/2017 | Mallik |
| 9,706,568 B2 | 7/2017 | Ekpenyong |
| 9,750,014 B2 | 8/2017 | Sadek |
| 9,755,705 B2 | 9/2017 | Hou |
| 9,762,372 B2 | 9/2017 | Ekpenyong et al. |
| 9,780,847 B2 | 10/2017 | Budianu |
| 9,781,693 B2 | 10/2017 | Ji |
| 9,788,361 B2 | 10/2017 | Valliappan |
| 9,813,497 B2 | 11/2017 | Mallik |
| 9,814,040 B2 | 11/2017 | Bhushan |
| 9,814,058 B2 | 11/2017 | Jiang |
| 9,819,471 B2 | 11/2017 | Chen et al. |
| 9,825,798 B1 | 11/2017 | Sun |
| 9,832,785 B2 | 11/2017 | Kadous |
| 9,847,862 B2 | 12/2017 | Soriaga |
| 9,860,033 B2 | 1/2018 | Kadous |
| 9,867,194 B2 | 1/2018 | Kadous |
| 9,877,203 B2 | 1/2018 | Yoo |
| 9,877,230 B2 | 1/2018 | Chen et al. |
| 9,882,623 B2 | 1/2018 | Sun |
| 9,888,389 B2 | 2/2018 | Bendlin et al. |
| 9,894,701 B2 | 2/2018 | Ang |
| 9,900,074 B2 | 2/2018 | Mallik |
| 9,923,690 B2 | 3/2018 | Ekpenyong |
| 9,924,368 B2 | 3/2018 | Valliappan |
| 9,929,812 B2 | 3/2018 | Manolakos |
| 9,929,835 B2 | 3/2018 | Dabeer |
| 9,936,400 B2 | 4/2018 | Lee |
| 9,936,469 B2 | 4/2018 | Ji |
| 9,936,498 B2 | 4/2018 | Azarian Yazdi |
| 9,936,519 B2 | 4/2018 | Mukkavilli |
| 9,942,801 B2 | 4/2018 | Yerramalli |
| 9,954,668 B2 | 4/2018 | Lee |
| 9,955,365 B2 | 4/2018 | Lin |
| 9,955,497 B2 | 4/2018 | Jiang |
| 9,961,579 B2 | 5/2018 | Geirhofer |
| 9,967,070 B2 | 5/2018 | Jiang |
| 9,967,729 B2 | 5/2018 | Wang |
| 9,973,923 B2 | 5/2018 | Damnjanovic |
| 9,974,093 B2 | 5/2018 | Lin |
| 9,979,450 B2 | 5/2018 | Jiang |
| 9,980,271 B2 | 5/2018 | Soriaga |
| 9,985,802 B2 | 5/2018 | Jiang |
| 9,991,989 B2 | 6/2018 | Malladi |
| 9,992,004 B2 | 6/2018 | Mallik |
| 9,992,790 B2 | 6/2018 | Jiang |
| 10,009,053 B2 | 6/2018 | Somasundaram |
| 10,009,160 B2 | 6/2018 | Jiang |
| 10,009,912 B2 | 6/2018 | Abraham |
| 10,020,911 B2 | 7/2018 | Mallik |
| 10,021,677 B2 | 7/2018 | Mallik |
| 10,027,462 B2 | 7/2018 | Jiang |
| 10,028,240 B2 | 7/2018 | Ji |
| 10,028,332 B2 | 7/2018 | Mallik |
| 10,033,558 B2 | 7/2018 | Yoo |
| 10,033,577 B2 | 7/2018 | Soriaga |
| 10,033,578 B2 | 7/2018 | Soriaga |
| 10,034,269 B2 | 7/2018 | Sun |
| 10,038,528 B2 | 7/2018 | Jiang |
| 10,038,544 B2 | 7/2018 | Zeng |
| 10,044,438 B2 | 8/2018 | Kadous |
| 10,044,459 B2 | 8/2018 | Chendamarai Kannan |
| 10,057,019 B2 | 8/2018 | Jiang |
| 10,075,187 B2 | 9/2018 | Jiang |
| 10,075,194 B2 | 9/2018 | Lin |
| 10,075,271 B2 | 9/2018 | Soriaga |
| 10,075,970 B2 | 9/2018 | Jiang |
| 10,080,214 B2 | 9/2018 | Lin |
| 10,084,563 B2 | 9/2018 | Park |
| 10,084,578 B2 | 9/2018 | Azarian Yazdi |
| 10,085,283 B2 | 9/2018 | Yoo |
| 10,091,789 B2 | 10/2018 | Valliappan |
| 10,091,810 B2 | 10/2018 | Zeng |
| 10,097,260 B2 | 10/2018 | Hosseini |
| 10,098,059 B2 | 10/2018 | Ly |
| 10,098,140 B2 | 10/2018 | Mallik |
| 10,104,616 B2 | 10/2018 | Ang |
| 10,104,624 B2 | 10/2018 | Sundararajan |
| 10,122,559 B2 | 11/2018 | Manolakos |
| 10,123,219 B2 | 11/2018 | Bhushan |
| 10,123,323 B2 | 11/2018 | Mallik |
| 10,135,591 B2 | 11/2018 | Chen |
| 10,136,333 B2 | 11/2018 | Yoo |
| 10,136,452 B2 | 11/2018 | Liu |
| 10,141,991 B2 | 11/2018 | Jiang |
| 10,142,060 B2 | 11/2018 | Xu |
| 10,143,005 B2 | 11/2018 | Chendamarai Kannan |
| 10,149,293 B2 | 12/2018 | Damnjanovic |
| 10,149,318 B2 | 12/2018 | Sun |
| 10,158,393 B2 | 12/2018 | Ekpenyong et al. |
| 10,159,097 B2 | 12/2018 | Ji |
| 10,172,063 B1 * | 1/2019 | Balmakhtar .......... H04W 36/22 |
| 10,177,826 B2 | 1/2019 | Manolakos |
| 10,178,649 B2 | 1/2019 | Liu |
| 10,182,404 B2 | 1/2019 | Prakash |
| 10,182,426 B2 | 1/2019 | Ji |
| 10,187,900 B2 | 1/2019 | Zhang |
| 10,200,140 B2 | 2/2019 | Li |
| 10,200,904 B2 | 2/2019 | Zhang |
| 10,200,994 B2 | 2/2019 | Park |
| 10,201,014 B2 | 2/2019 | Kadous |
| 10,205,618 B2 | 2/2019 | Wang |
| 10,206,117 B2 | 2/2019 | Damnjanovic |
| 10,206,181 B2 | 2/2019 | Ekpenyong et al. |
| 10,218,406 B2 | 2/2019 | Liu |
| 10,219,235 B2 | 2/2019 | Patel |
| 10,219,252 B2 | 2/2019 | Chendamarai Kannan |
| 10,219,292 B2 | 2/2019 | Damnjanovic |

(56) References Cited

U.S. PATENT DOCUMENTS

| | | |
|---|---|---|
| 10,219,300 B2 | 2/2019 | Gorokhov |
| 10,224,966 B2 | 3/2019 | Li |
| 10,225,065 B2 | 3/2019 | Ang |
| 10,225,818 B2 | 3/2019 | Liu |
| 10,230,502 B2 | 3/2019 | Ji |
| 10,231,131 B2 | 3/2019 | Zhang |
| 10,231,132 B2 | 3/2019 | Zhang |
| 10,231,259 B2 | 3/2019 | Lin |
| 10,237,030 B2 | 3/2019 | Azarian Yazdi |
| 10,237,037 B2 | 3/2019 | Jiang |
| 10,237,889 B2 | 3/2019 | Sundararajan |
| 10,244,399 B2 | 3/2019 | Damnjanovic |
| 10,250,678 B2 | 4/2019 | Mallik |
| 10,257,844 B2 | 4/2019 | Yang |
| 10,257,848 B2 | 4/2019 | Sun |
| 10,257,851 B2 | 4/2019 | Patel |
| 10,263,745 B2 | 4/2019 | Soriaga |
| 10,263,754 B2 | 4/2019 | Lin |
| 10,264,541 B2 | 4/2019 | Patel |
| 10,270,562 B2 | 4/2019 | Yang |
| 10,270,579 B2 | 4/2019 | Chendamarai Kannan |
| 10,278,177 B2 | 4/2019 | Sadek |
| 10,285,117 B2 | 5/2019 | Yoo |
| 10,285,189 B2 | 5/2019 | Sundararajan |
| 10,291,372 B2 | 5/2019 | Azarian Yazdi |
| 10,291,379 B2 | 5/2019 | Kadous |
| 10,292,093 B2 | 5/2019 | Chendamarai Kannan |
| 10,298,289 B2 | 5/2019 | Yerramalli |
| 10,298,434 B2 | 5/2019 | Manolakos |
| 10,299,284 B2 | 5/2019 | Sadek |
| 10,312,987 B2 | 6/2019 | Mallik |
| 10,312,993 B2 | 6/2019 | Rupasinghe et al. |
| 10,313,160 B2 | 6/2019 | Jiang |
| 10,313,851 B2 | 6/2019 | Blasco Serrano et al. |
| 10,314,065 B2 | 6/2019 | Yang |
| 10,320,428 B2 | 6/2019 | Sarkis |
| 10,327,241 B2 | 6/2019 | Kadous |
| 10,327,261 B2 | 6/2019 | Naghshvar |
| 10,333,595 B2 | 6/2019 | Fakoorian |
| 10,333,668 B2 | 6/2019 | Yoo |
| 10,333,752 B2 | 6/2019 | Jiang |
| 10,334,450 B2 | 6/2019 | Bendlin et al. |
| 10,334,546 B2 | 6/2019 | Chendamarai Kannan |
| 10,334,594 B2 | 6/2019 | Sundararajan |
| 10,341,884 B2 | 7/2019 | Sun |
| 10,341,976 B2 | 7/2019 | Ji |
| 10,342,012 B2 | 7/2019 | Mukkavilli |
| 10,348,329 B2 | 7/2019 | Soriaga |
| 10,348,432 B2 | 7/2019 | Chen et al. |
| 10,349,404 B2 | 7/2019 | Chendamarai Kannan |
| 10,355,803 B2 | 7/2019 | Manolakos |
| 10,356,626 B2 | 7/2019 | Montojo |
| 10,356,800 B2 | 7/2019 | Manolakos |
| 10,356,811 B2 | 7/2019 | Luo |
| 10,356,816 B2 | 7/2019 | Valliappan |
| 10,362,574 B2 | 7/2019 | Chendamarai Kannan |
| 10,367,621 B2 | 7/2019 | Jiang |
| 10,368,301 B2 | 7/2019 | Chendamarai Kannan |
| 10,368,305 B2 | 7/2019 | Radulescu |
| 10,368,348 B2 | 7/2019 | Chendamarai Kannan |
| 10,368,372 B2 | 7/2019 | Chendamarai Kannan |
| 10,374,777 B2 | 8/2019 | Kadous |
| 10,375,711 B2 | 8/2019 | Sadek |
| 10,375,718 B2 | 8/2019 | Manolakos |
| 10,382,177 B2 | 8/2019 | Jiang |
| 10,382,233 B2 | 8/2019 | Abdelghaffar |
| 10,389,479 B2 | 8/2019 | Yoo |
| 10,389,503 B2 | 8/2019 | Soriaga |
| 10,389,504 B2 | 8/2019 | Soriaga |
| 10,390,361 B2 | 8/2019 | Mukkavilli |
| 10,390,362 B2 | 8/2019 | Gupta |
| 10,396,962 B2 | 8/2019 | Li |
| 10,397,754 B2 | 8/2019 | Vajapeyam |
| 10,397,796 B2 | 8/2019 | Sun |
| 10,404,332 B2 | 9/2019 | Ji |
| 10,404,340 B2 | 9/2019 | Manolakos |
| 10,404,434 B2 | 9/2019 | Kannan |
| 10,404,442 B2 | 9/2019 | Chen et al. |
| 10,404,509 B2 | 9/2019 | Sun |
| 10,405,228 B2 | 9/2019 | Liu |
| 10,405,242 B2 | 9/2019 | Kadous |
| 10,405,262 B2 | 9/2019 | Chendamarai Kannan |
| 10,405,278 B2 | 9/2019 | Ang |
| 10,405,335 B2 | 9/2019 | Barghi |
| 10,411,782 B2 | 9/2019 | Namgoong |
| 10,411,795 B2 | 9/2019 | Liu |
| 10,412,632 B2 | 9/2019 | Li |
| 10,412,704 B2 | 9/2019 | Sun |
| 10,412,719 B2 | 9/2019 | Chen |
| 10,412,733 B2 | 9/2019 | Sun |
| 10,412,760 B2 | 9/2019 | Ekpenyong |
| 10,419,171 B2 | 9/2019 | Park |
| 10,419,244 B2 | 9/2019 | Jiang |
| 10,425,824 B2 | 9/2019 | Li |
| 10,425,826 B2 | 9/2019 | Fakoorian |
| 10,425,923 B2 | 9/2019 | Wang |
| 10,425,945 B2 | 9/2019 | Sun |
| 10,432,357 B2 | 10/2019 | Yang |
| 10,433,159 B2 | 10/2019 | Ekpenyong et al. |
| 10,433,179 B2 | 10/2019 | Zhang |
| 10,440,657 B2 | 10/2019 | Sundararajan |
| 10,440,726 B2 | 10/2019 | Jiang |
| 10,440,729 B2 | 10/2019 | Li |
| 10,447,426 B2 | 10/2019 | Sundararajan |
| 10,447,447 B2 | 10/2019 | Namgoong |
| 10,448,296 B2 | 10/2019 | Radulescu |
| 10,448,380 B2 | 10/2019 | Islam |
| 10,454,541 B2 | 10/2019 | Sundararajan |
| 10,455,455 B2 | 10/2019 | Yoo |
| 10,455,457 B2 | 10/2019 | Sadek |
| 10,461,797 B2 | 10/2019 | Liu |
| 10,461,889 B2 | 10/2019 | Park |
| 10,461,891 B2 | 10/2019 | Park |
| 10,461,976 B2 | 10/2019 | Chen |
| 10,462,676 B2 | 10/2019 | Mallik |
| 10,469,203 B2 | 11/2019 | Sankar |
| 10,470,048 B2 | 11/2019 | Zhang |
| 10,470,112 B2 | 11/2019 | Damnjanovic |
| 10,476,641 B2 | 11/2019 | Yang |
| 10,476,650 B2 | 11/2019 | Yang |
| 10,476,781 B2 | 11/2019 | Luo |
| 10,477,437 B2 | 11/2019 | Zhang |
| 10,477,466 B2 | 11/2019 | Ly |
| 10,477,526 B2 | 11/2019 | Chendamarai Kannan |
| 10,484,054 B2 | 11/2019 | Sundararajan |
| 10,484,129 B2 | 11/2019 | Jiang |
| 10,484,135 B2 | 11/2019 | Mallik |
| 10,484,146 B2 | 11/2019 | Sun |
| 10,484,212 B2 | 11/2019 | Yoo |
| 10,484,878 B2 | 11/2019 | Patel |
| 10,484,934 B2 | 11/2019 | Malik |
| 10,484,935 B2 | 11/2019 | Li |
| 10,484,954 B2 | 11/2019 | Liu |
| 10,484,959 B2 | 11/2019 | Liu |
| 10,484,972 B2 | 11/2019 | Lin |
| 10,484,992 B2 | 11/2019 | Sadek |
| 10,485,016 B2 | 11/2019 | Zeng |
| 10,485,019 B2 | 11/2019 | Ekpenyong |
| 10,485,027 B2 | 11/2019 | Mallik |
| 10,492,181 B2 | 11/2019 | Jiang |
| 10,492,220 B2 | 11/2019 | Sun |
| 10,498,503 B2 | 12/2019 | Tavildar |
| 10,499,393 B2 | 12/2019 | Mukkavilli |
| 10,499,394 B2 | 12/2019 | Damnjanovic |
| 10,505,701 B2 | 12/2019 | Ang |
| 10,506,573 B2 | 12/2019 | Chen et al. |
| 10,506,629 B2 | 12/2019 | Sun et al. |
| 10,511,399 B2 | 12/2019 | Sun et al. |
| 10,511,987 B2 | 12/2019 | Liu et al. |
| 10,512,098 B2 | 12/2019 | Jiang |
| 10,516,618 B2 | 12/2019 | Barghi et al. |
| 10,523,300 B2 | 12/2019 | Malik et al. |
| 10,523,369 B2 | 12/2019 | Yang |
| 10,524,257 B2 | 12/2019 | Li |

(56) References Cited

U.S. PATENT DOCUMENTS

| | | |
|---|---|---|
| 10,524,259 B2 | 12/2019 | Azarian Yazdi |
| 10,524,278 B2 | 12/2019 | Abraham |
| 10,524,279 B2 | 12/2019 | Yoo |
| 10,536,195 B2 | 1/2020 | Sun |
| 10,536,944 B2 | 1/2020 | Zhang |
| 10,536,966 B2 | 1/2020 | Liu et al. |
| 10,541,780 B2 | 1/2020 | Mukkavilli |
| 10,541,791 B2 | 1/2020 | Ji |
| 10,541,851 B2 | 1/2020 | Malik et al. |
| 10,542,436 B2 | 1/2020 | Liu et al. |
| 10,542,541 B2 | 1/2020 | Valliappan et al. |
| 10,542,543 B2 | 1/2020 | Yerramalli et al. |
| 10,542,556 B2 | 1/2020 | Mallik |
| 10,547,402 B2 | 1/2020 | Li |
| 10,547,415 B2 | 1/2020 | Jiang |
| 10,547,422 B2 | 1/2020 | Yoo et al. |
| 10,547,494 B2 | 1/2020 | Liu et al. |
| 10,548,020 B2 | 1/2020 | Khoshnevisan et al. |
| 10,548,131 B2 | 1/2020 | Yerramalli et al. |
| 10,548,144 B2 | 1/2020 | Soriaga |
| 10,548,153 B2 | 1/2020 | Akkarakaran et al. |
| 10,548,155 B2 | 1/2020 | Manolakos |
| 10,554,462 B2 | 2/2020 | Yang |
| 10,554,539 B2 | 2/2020 | Luo |
| 10,554,540 B2 | 2/2020 | Luo |
| 10,555,203 B2 | 2/2020 | Malik |
| 10,555,210 B2 | 2/2020 | Sun |
| 10,555,220 B2 | 2/2020 | Yerramalli |
| 10,560,304 B2 | 2/2020 | Lei |
| 10,567,118 B2 | 2/2020 | Yang |
| 10,567,204 B2 | 2/2020 | Bertrand et al. |
| 10,568,128 B2 | 2/2020 | Li |
| 10,574,422 B2 | 2/2020 | Wang |
| 10,574,565 B2 | 2/2020 | Luo |
| 10,575,185 B2 | 2/2020 | Li |
| 10,581,568 B2 | 3/2020 | Mallik |
| 10,581,572 B2 | 3/2020 | Chendamarai Kannan |
| 10,581,722 B2 | 3/2020 | Luo |
| 10,587,435 B2 | 3/2020 | Sun et al. |
| 10,587,497 B2 | 3/2020 | Luo |
| 10,594,532 B2 | 3/2020 | Wang |
| 10,595,225 B2 | 3/2020 | John Wilson |
| 10,595,302 B2 | 3/2020 | Mukkavilli |
| 10,595,327 B2 | 3/2020 | Sadek |
| 10,595,332 B2 | 3/2020 | Jiang |
| 10,595,342 B2 | 3/2020 | Islam |
| 10,602,515 B2 | 3/2020 | Ly |
| 10,602,543 B2 | 3/2020 | Sun |
| 10,602,545 B2 | 3/2020 | Mallik |
| 10,608,785 B2 | 3/2020 | Wang |
| 10,609,660 B2 | 3/2020 | Liu |
| 10,609,664 B2 | 3/2020 | Zhang |
| 10,615,825 B2 | 4/2020 | Sarkis |
| 10,616,737 B2 | 4/2020 | Liu |
| 10,616,771 B2 | 4/2020 | Montojo |
| 10,616,912 B2 | 4/2020 | Chendamarai Kannan |
| 10,616,914 B2 | 4/2020 | Manolakos |
| 10,623,138 B2 | 4/2020 | Yang |
| 10,623,163 B2 | 4/2020 | Sun |
| 10,623,208 B2 | 4/2020 | Jiang |
| 10,624,079 B2 | 4/2020 | Xu |
| 10,630,450 B2 | 4/2020 | Sun |
| 10,631,323 B2 | 4/2020 | Zeng |
| 10,681,724 B2 | 6/2020 | Blasco Serrano et al. |
| 10,687,247 B2 | 6/2020 | Chen et al. |
| 10,693,692 B2 | 6/2020 | Hadani et al. |
| 10,892,929 B2 | 1/2021 | Sorrentino et al. |
| 10,924,249 B2 | 2/2021 | Chen et al. |
| 10,999,753 B2 | 5/2021 | Chandrasekhar et al. |
| 11,005,632 B2 | 5/2021 | Ekpenyong |
| 11,012,224 B2 | 5/2021 | Ekpenyong et al. |
| 11,139,905 B2 | 10/2021 | Chen et al. |
| 11,147,053 B2 | 10/2021 | Chen et al. |
| 11,177,919 B2 | 11/2021 | Ekpenyong et al. |
| 11,196,474 B2 | 12/2021 | Sun et al. |
| 11,239,971 B2 | 2/2022 | Chen et al. |
| 2004/0121730 A1 | 6/2004 | Kadous |
| 2006/0203794 A1 | 9/2006 | Sampath |
| 2007/0041457 A1 | 2/2007 | Kadous |
| 2007/0071147 A1 | 3/2007 | Sampath |
| 2007/0165738 A1 | 7/2007 | Barriac |
| 2008/0025241 A1 | 1/2008 | Bhushan |
| 2008/0112495 A1 | 5/2008 | Gore |
| 2009/0271686 A1 | 10/2009 | Jiang et al. |
| 2010/0003931 A1 | 1/2010 | Krishnan |
| 2010/0067422 A1 | 3/2010 | Kadous |
| 2010/0124930 A1* | 5/2010 | Andrews ............ H04W 72/0446 455/447 |
| 2010/0232338 A1 | 9/2010 | Krishnamoorthi |
| 2010/0251069 A1 | 9/2010 | Sun et al. |
| 2011/0003606 A1 | 1/2011 | Forenza et al. |
| 2011/0007680 A1 | 1/2011 | Kadous |
| 2011/0007688 A1 | 1/2011 | Veeravalli |
| 2011/0243079 A1 | 10/2011 | Chen et al. |
| 2011/0256834 A1 | 10/2011 | Dayal |
| 2012/0026940 A1 | 2/2012 | Barbieri |
| 2012/0051257 A1* | 3/2012 | Kim .................. H04B 7/0663 370/252 |
| 2012/0057540 A1* | 3/2012 | Fang .................. H04B 7/063 370/328 |
| 2012/0063321 A1 | 3/2012 | Chandrasekhar et al. |
| 2012/0077532 A1 | 3/2012 | Kadous |
| 2012/0113794 A1 | 5/2012 | Roman et al. |
| 2012/0113906 A1 | 5/2012 | Kadous |
| 2012/0140798 A1 | 6/2012 | Kadous |
| 2012/0201158 A1 | 8/2012 | Geirhofer |
| 2012/0213303 A1 | 8/2012 | Kadous |
| 2012/0220286 A1 | 8/2012 | Chen et al. |
| 2012/0314655 A1 | 12/2012 | Xue |
| 2013/0058276 A1 | 3/2013 | Somasundaram |
| 2013/0194948 A1 | 8/2013 | Mallik |
| 2013/0196678 A1* | 8/2013 | Liu .................... H04W 72/04 455/452.1 |
| 2013/0229935 A1 | 9/2013 | Gorokhov |
| 2013/0294275 A1 | 11/2013 | Gorokhov |
| 2013/0315156 A1 | 11/2013 | Xiao et al. |
| 2013/0336193 A1 | 12/2013 | Luo |
| 2013/0336249 A1 | 12/2013 | Zhao |
| 2014/0023001 A1 | 1/2014 | Huang |
| 2014/0029456 A1 | 1/2014 | Mallik |
| 2014/0036859 A1 | 2/2014 | Ekpenyong et al. |
| 2014/0050202 A1* | 2/2014 | Baligh ............... H04W 72/542 370/336 |
| 2014/0071894 A1 | 3/2014 | Kairouz |
| 2014/0079155 A1 | 3/2014 | Wang |
| 2014/0087784 A1* | 3/2014 | Lou .................... H04B 7/024 455/524 |
| 2014/0126491 A1 | 5/2014 | Ekpenyong et al. |
| 2014/0192740 A1 | 7/2014 | Ekpenyong et al. |
| 2014/0204857 A1 | 7/2014 | Mallik |
| 2014/0219117 A1 | 8/2014 | Meshkati |
| 2014/0219243 A1 | 8/2014 | Meshkati |
| 2014/0226519 A1* | 8/2014 | Nagata ............... H04B 7/0639 370/252 |
| 2014/0273884 A1 | 9/2014 | Mantravadi |
| 2014/0301309 A1 | 10/2014 | Luo |
| 2015/0063150 A1 | 3/2015 | Sadek |
| 2015/0063151 A1 | 3/2015 | Sadek |
| 2015/0063323 A1 | 3/2015 | Sadek |
| 2015/0085686 A1 | 3/2015 | Chande |
| 2015/0092873 A1 | 4/2015 | Ashikhmin et al. |
| 2015/0139015 A1 | 5/2015 | Kadous |
| 2015/0163823 A1 | 6/2015 | Sadek |
| 2015/0180622 A1 | 6/2015 | Yoo |
| 2015/0282077 A1 | 10/2015 | Yavuz |
| 2015/0319702 A1 | 11/2015 | Patel |
| 2015/0350919 A1 | 12/2015 | Patel |
| 2015/0351106 A1* | 12/2015 | Wijetunge ........... H04W 72/54 370/329 |
| 2016/0028531 A1 | 1/2016 | Guo |
| 2016/0088625 A1 | 3/2016 | Kadous |
| 2016/0095039 A1 | 3/2016 | Valliappan |
| 2016/0095040 A1 | 3/2016 | Valliappan |

(56) References Cited

U.S. PATENT DOCUMENTS

| | | |
|---|---|---|
| 2016/0112168 A1 | 4/2016 | Yoo |
| 2016/0128045 A1 | 5/2016 | Yazdi et al. |
| 2016/0128130 A1 | 5/2016 | Sadek |
| 2016/0192388 A1 | 6/2016 | Ekpenyong et al. |
| 2016/0234820 A1 | 8/2016 | Mallik |
| 2016/0248559 A1 | 8/2016 | Guo et al. |
| 2016/0270046 A1 | 9/2016 | Lin et al. |
| 2016/0295557 A1 | 10/2016 | Yazdi et al. |
| 2016/0352481 A1 | 12/2016 | Jiang et al. |
| 2016/0353482 A1 | 12/2016 | Valliappan |
| 2016/0381673 A1 | 12/2016 | Sun |
| 2017/0026976 A1 | 1/2017 | Yoo |
| 2017/0041766 A1 | 2/2017 | Vajapeyam |
| 2017/0141798 A1 | 5/2017 | Kudekar et al. |
| 2017/0142705 A1 | 5/2017 | Chendamarai Kannan |
| 2017/0149543 A1 | 5/2017 | Ang et al. |
| 2017/0150486 A1 | 5/2017 | Ang et al. |
| 2017/0163315 A1 | 6/2017 | Wu et al. |
| 2017/0163433 A1 | 6/2017 | Luo |
| 2017/0171855 A1 | 6/2017 | Sundararajan et al. |
| 2017/0171879 A1 | 6/2017 | Jiang et al. |
| 2017/0207884 A1 | 7/2017 | Jiang et al. |
| 2017/0215103 A1* | 7/2017 | Liu ............. H04J 11/0069 |
| 2017/0222771 A1 | 8/2017 | Chendamarai Kannan |
| 2017/0223739 A1 | 8/2017 | Mallik |
| 2017/0272224 A1 | 9/2017 | Ang et al. |
| 2017/0289984 A1* | 10/2017 | Baligh ............. H04L 5/0035 |
| 2017/0311346 A1 | 10/2017 | Chendamarai Kannan |
| 2017/0318563 A1 | 11/2017 | Yang et al. |
| 2017/0332288 A1 | 11/2017 | Sadek |
| 2017/0332338 A1 | 11/2017 | Mallik |
| 2017/0338996 A1 | 11/2017 | Sankar et al. |
| 2017/0359146 A1 | 12/2017 | Yang et al. |
| 2017/0359714 A1 | 12/2017 | Gupta et al. |
| 2018/0019766 A1 | 1/2018 | Yang et al. |
| 2018/0026740 A1 | 1/2018 | Chen et al. |
| 2018/0026764 A1 | 1/2018 | Namgoong et al. |
| 2018/0032516 A1 | 2/2018 | Mallik |
| 2018/0035423 A1 | 2/2018 | Wang |
| 2018/0035455 A1 | 2/2018 | Xu |
| 2018/0035463 A1 | 2/2018 | Mallik |
| 2018/0042030 A1 | 2/2018 | Xu |
| 2018/0049097 A1 | 2/2018 | Chen |
| 2018/0054348 A1 | 2/2018 | Luo |
| 2018/0054780 A1 | 2/2018 | Radulescu |
| 2018/0054848 A1 | 2/2018 | Yoo |
| 2018/0062801 A1 | 3/2018 | Zhang |
| 2018/0062810 A1 | 3/2018 | Vitthaladevuni |
| 2018/0070242 A1 | 3/2018 | Damnjanovic |
| 2018/0077725 A1 | 3/2018 | Sun |
| 2018/0083824 A1 | 3/2018 | Yang |
| 2018/0091373 A1 | 3/2018 | Manolakos |
| 2018/0092002 A1 | 3/2018 | Manolakos |
| 2018/0092081 A1 | 3/2018 | Chen |
| 2018/0092110 A1 | 3/2018 | Mallik et al. |
| 2018/0097534 A1 | 4/2018 | Manolakos |
| 2018/0098293 A1 | 4/2018 | Jiang |
| 2018/0098307 A1 | 4/2018 | Yang |
| 2018/0098316 A1 | 4/2018 | Wang |
| 2018/0103428 A1 | 4/2018 | Jiang |
| 2018/0103485 A1 | 4/2018 | Jiang |
| 2018/0109406 A1 | 4/2018 | Wang |
| 2018/0110048 A1 | 4/2018 | Ang |
| 2018/0110056 A1 | 4/2018 | Zhang |
| 2018/0124753 A1 | 5/2018 | Sun |
| 2018/0124777 A1 | 5/2018 | Yerramalli |
| 2018/0124789 A1 | 5/2018 | Yerramalli |
| 2018/0131499 A1 | 5/2018 | Zhang |
| 2018/0132223 A1 | 5/2018 | Sankar |
| 2018/0139618 A1 | 5/2018 | Yerramalli |
| 2018/0139758 A1 | 5/2018 | Sankar |
| 2018/0160328 A1 | 6/2018 | Chendamarai Kannan |
| 2018/0160389 A1 | 6/2018 | Yerramalli |
| 2018/0167848 A1 | 6/2018 | Lei |
| 2018/0167941 A1 | 6/2018 | Zhang |
| 2018/0176922 A1 | 6/2018 | Li |
| 2018/0176946 A1 | 6/2018 | Sun |
| 2018/0191470 A1 | 7/2018 | Manolakos |
| 2018/0198560 A1 | 7/2018 | Jiang |
| 2018/0213486 A1 | 7/2018 | Yoo |
| 2018/0220428 A1 | 8/2018 | Sun |
| 2018/0227011 A1 | 8/2018 | Yerramalli |
| 2018/0227771 A1 | 8/2018 | Malik |
| 2018/0227797 A1 | 8/2018 | Liu |
| 2018/0227936 A1 | 8/2018 | Yerramalli |
| 2018/0227944 A1 | 8/2018 | Yerramalli |
| 2018/0234830 A1 | 8/2018 | Wang |
| 2018/0234880 A1 | 8/2018 | Jiang |
| 2018/0234881 A1 | 8/2018 | Hosseini |
| 2018/0234968 A1 | 8/2018 | Sun |
| 2018/0234993 A1 | 8/2018 | Hosseini |
| 2018/0241494 A1 | 8/2018 | Chendamarai Kannan |
| 2018/0242348 A1 | 8/2018 | Chendamarai Kannan |
| 2018/0249486 A1 | 8/2018 | Hosseini |
| 2018/0249496 A1 | 8/2018 | Radulescu |
| 2018/0255584 A1 | 9/2018 | Sun |
| 2018/0262237 A1* | 9/2018 | Chen ............. H04B 7/0632 |
| 2018/0262311 A1 | 9/2018 | Wang |
| 2018/0262317 A1 | 9/2018 | Jiang |
| 2018/0269898 A1 | 9/2018 | Sun |
| 2018/0270022 A1 | 9/2018 | Sun |
| 2018/0270023 A1 | 9/2018 | Jiang |
| 2018/0270816 A1 | 9/2018 | Li |
| 2018/0279134 A1 | 9/2018 | Malik |
| 2018/0279292 A1 | 9/2018 | Luo |
| 2018/0279298 A1 | 9/2018 | Wang |
| 2018/0287744 A1 | 10/2018 | Sundararajan |
| 2018/0287745 A1 | 10/2018 | Sun |
| 2018/0287840 A1 | 10/2018 | Akkarakaran |
| 2018/0287870 A1 | 10/2018 | Yerramalli |
| 2018/0288747 A1 | 10/2018 | Sun |
| 2018/0288749 A1 | 10/2018 | Sun |
| 2018/0302186 A1 | 10/2018 | Reddy |
| 2018/0310262 A1 | 10/2018 | Ly |
| 2018/0310341 A1 | 10/2018 | Yerramalli |
| 2018/0323943 A1 | 11/2018 | Jiang |
| 2018/0324676 A1 | 11/2018 | Huang |
| 2018/0324713 A1 | 11/2018 | Yoo |
| 2018/0331693 A1 | 11/2018 | Lou |
| 2018/0343676 A1 | 11/2018 | Yerramalli |
| 2018/0352520 A1 | 12/2018 | Zhang |
| 2018/0352563 A1 | 12/2018 | Liu |
| 2018/0367245 A1 | 12/2018 | Soriaga |
| 2018/0367362 A1 | 12/2018 | Sun |
| 2018/0368089 A1 | 12/2018 | Yerramalli |
| 2018/0375612 A1 | 12/2018 | Sarkis |
| 2018/0375629 A1 | 12/2018 | Lee |
| 2019/0007946 A1 | 1/2019 | Yerramalli |
| 2019/0007956 A1 | 1/2019 | Jiang |
| 2019/0014481 A1 | 1/2019 | Yerramalli |
| 2019/0014507 A1 | 1/2019 | Zhang |
| 2019/0014589 A1 | 1/2019 | Yerramalli |
| 2019/0020424 A1 | 1/2019 | Yerramalli |
| 2019/0020461 A1 | 1/2019 | Yerramalli |
| 2019/0020522 A1 | 1/2019 | Sun |
| 2019/0020528 A1 | 1/2019 | Lei |
| 2019/0020529 A1 | 1/2019 | Lei |
| 2019/0021080 A1 | 1/2019 | Lei |
| 2019/0021097 A1 | 1/2019 | Li |
| 2019/0028119 A1 | 1/2019 | Yang |
| 2019/0028999 A1 | 1/2019 | Yerramalli |
| 2019/0029019 A1 | 1/2019 | Zhang |
| 2019/0036663 A1 | 1/2019 | Azarian Yazdi |
| 2019/0037427 A1 | 1/2019 | Yerramalli |
| 2019/0037481 A1 | 1/2019 | Zhang |
| 2019/0037482 A1 | 1/2019 | Damnjanovic |
| 2019/0037603 A1 | 1/2019 | Damnjanovic |
| 2019/0044540 A1 | 2/2019 | Jiang |
| 2019/0044777 A1 | 2/2019 | Manolakos |
| 2019/0045509 A1 | 2/2019 | Mallik |
| 2019/0052400 A1 | 2/2019 | Soriaga |
| 2019/0053255 A1 | 2/2019 | Li |
| 2019/0053266 A1 | 2/2019 | Jiang |
| 2019/0053269 A1 | 2/2019 | Lei |

(56) References Cited

U.S. PATENT DOCUMENTS

| | | |
|---|---|---|
| 2019/0058553 A1 | 2/2019 | Sun |
| 2019/0059001 A1 | 2/2019 | Yerramalli |
| 2019/0059102 A1 | 2/2019 | Yerramalli |
| 2019/0068335 A1 | 2/2019 | Li |
| 2019/0068345 A1 | 2/2019 | Chen |
| 2019/0069325 A1 | 2/2019 | Yerramalli |
| 2019/0075591 A1 | 3/2019 | Sun |
| 2019/0075597 A1 | 3/2019 | Yerramalli |
| 2019/0081768 A1 | 3/2019 | Zhang |
| 2019/0082333 A1 | 3/2019 | Malik |
| 2019/0089489 A1 | 3/2019 | Li |
| 2019/0090178 A1 | 3/2019 | Liu |
| 2019/0090256 A1 | 3/2019 | Liu |
| 2019/0090273 A1 | 3/2019 | Yoo |
| 2019/0098654 A1 | 3/2019 | Li |
| 2019/0098656 A1 | 3/2019 | Chendamarai Kannan |
| 2019/0098663 A1 | 3/2019 | Zhang |
| 2019/0103928 A1 | 4/2019 | Nagaraja |
| 2019/0104416 A1 | 4/2019 | Yerramalli |
| 2019/0104514 A1 | 4/2019 | Chendamarai Kannan |
| 2019/0104542 A1 | 4/2019 | Chendamarai Kannan |
| 2019/0104546 A1 | 4/2019 | Chendamarai Kannan |
| 2019/0104547 A1 | 4/2019 | Xue |
| 2019/0110208 A1 | 4/2019 | Xue |
| 2019/0110254 A1 | 4/2019 | Yerramalli |
| 2019/0110302 A1 | 4/2019 | Zhang |
| 2019/0110317 A1 | 4/2019 | Zhang |
| 2019/0116560 A1* | 4/2019 | Naderializadeh ..... H04W 24/02 |
| 2019/0116585 A1 | 4/2019 | Chakraborty |
| 2019/0116599 A1 | 4/2019 | Xue |
| 2019/0123779 A1 | 4/2019 | Ekpenyong et al. |
| 2019/0124518 A1 | 4/2019 | Zhang |
| 2019/0124595 A1 | 4/2019 | Lei |
| 2019/0124613 A1 | 4/2019 | Liu |
| 2019/0124630 A1 | 4/2019 | Ji |
| 2019/0124663 A1 | 4/2019 | Liu |
| 2019/0124694 A1 | 4/2019 | Chendamarai Kannan |
| 2019/0124700 A1 | 4/2019 | Ji |
| 2019/0132817 A1 | 5/2019 | Liu |
| 2019/0141707 A1 | 5/2019 | Yerramalli |
| 2019/0141723 A1 | 5/2019 | Zhang |
| 2019/0141734 A1 | 5/2019 | Lei |
| 2019/0141744 A1 | 5/2019 | Naghshvar |
| 2019/0141783 A1 | 5/2019 | Malik |
| 2019/0149190 A1 | 5/2019 | Liu |
| 2019/0149364 A1 | 5/2019 | Sundararajan |
| 2019/0150088 A1 | 5/2019 | Sun |
| 2019/0150120 A1 | 5/2019 | Sarkis |
| 2019/0150179 A1 | 5/2019 | Soriaga |
| 2019/0150198 A1 | 5/2019 | Sun |
| 2019/0158221 A1 | 5/2019 | Sarkis |
| 2019/0158227 A1 | 5/2019 | Gupta |
| 2019/0158240 A1 | 5/2019 | Li |
| 2019/0158251 A1 | 5/2019 | Park |
| 2019/0158252 A1 | 5/2019 | Li |
| 2019/0158333 A1 | 5/2019 | Zhang |
| 2019/0159202 A1 | 5/2019 | Lee |
| 2019/0159280 A1 | 5/2019 | Chakraborty |
| 2019/0165902 A1 | 5/2019 | Li |
| 2019/0165982 A1 | 5/2019 | Gaal |
| 2019/0166589 A1 | 5/2019 | Yang |
| 2019/0166621 A1 | 5/2019 | Yerramalli |
| 2019/0166625 A1 | 5/2019 | Nam |
| 2019/0173521 A1 | 6/2019 | Liu |
| 2019/0173611 A1 | 6/2019 | Liu |
| 2019/0173619 A1 | 6/2019 | Li |
| 2019/0174518 A1 | 6/2019 | Jiang |
| 2019/0174532 A1 | 6/2019 | Damnjanovic |
| 2019/0174542 A1 | 6/2019 | Lei |
| 2019/0181979 A1 | 6/2019 | Wang |
| 2019/0181995 A1 | 6/2019 | Liu |
| 2019/0182826 A1 | 6/2019 | Yerramalli |
| 2019/0182845 A1 | 6/2019 | Xue |
| 2019/0190668 A1 | 6/2019 | Lei |
| 2019/0190681 A1 | 6/2019 | Li |
| 2019/0191391 A1 | 6/2019 | Ekpenyong et al. |
| 2019/0199786 A1 | 6/2019 | Mallik |
| 2019/0200385 A1 | 6/2019 | Xue |
| 2019/0207723 A1 | 7/2019 | Lei |
| 2019/0222342 A1 | 7/2019 | Park |
| 2019/0222343 A1 | 7/2019 | Park |
| 2019/0223184 A1 | 7/2019 | Sarkis |
| 2019/0223215 A1 | 7/2019 | Tian |
| 2019/0229788 A1 | 7/2019 | Zhang |
| 2019/0230697 A1 | 7/2019 | Yang |
| 2019/0238177 A1 | 8/2019 | Liu |
| 2019/0238196 A1 | 8/2019 | Lei |
| 2019/0238219 A1 | 8/2019 | Liu |
| 2019/0238284 A1 | 8/2019 | Liu |
| 2019/0239202 A1 | 8/2019 | Bhattad |
| 2019/0245560 A1 | 8/2019 | Yang |
| 2019/0245658 A1 | 8/2019 | Yang |
| 2019/0246410 A1 | 8/2019 | Zhang |
| 2019/0246419 A1 | 8/2019 | Sun |
| 2019/0246425 A1 | 8/2019 | Zhang |
| 2019/0253219 A1 | 8/2019 | Fan |
| 2019/0253232 A1 | 8/2019 | Park |
| 2019/0254081 A1 | 8/2019 | Li |
| 2019/0260451 A1 | 8/2019 | Sarkis |
| 2019/0261323 A1 | 8/2019 | Lee |
| 2019/0261354 A1 | 8/2019 | Fakoorian |
| 2019/0268059 A1 | 8/2019 | Yang |
| 2019/0268127 A1 | 8/2019 | Hosseini |
| 2019/0268129 A1 | 8/2019 | Lin |
| 2019/0268206 A1 | 8/2019 | Yang |
| 2019/0268907 A1 | 8/2019 | Bhattad |
| 2019/0268923 A1 | 8/2019 | Sundararajan |
| 2019/0268932 A1 | 8/2019 | Sundararajan |
| 2019/0268933 A1 | 8/2019 | Sun |
| 2019/0274162 A1 | 9/2019 | Zhang |
| 2019/0280829 A1 | 9/2019 | Wei |
| 2019/0280836 A1 | 9/2019 | Bhattad |
| 2019/0288761 A1 | 9/2019 | Mallik |
| 2019/0288789 A1 | 9/2019 | Li |
| 2019/0288800 A1 | 9/2019 | Hosseini |
| 2019/0289602 A1 | 9/2019 | Mukkavilli |
| 2019/0289629 A1 | 9/2019 | Luo |
| 2019/0296809 A1 | 9/2019 | Li |
| 2019/0296882 A1 | 9/2019 | Li |
| 2019/0305834 A1 | 10/2019 | Fakoorian |
| 2019/0305882 A1 | 10/2019 | Wang |
| 2019/0305911 A1 | 10/2019 | Sarkis |
| 2019/0306878 A1 | 10/2019 | Zhang |
| 2019/0306881 A1 | 10/2019 | Fakoorian |
| 2019/0312671 A1 | 10/2019 | Lin |
| 2019/0312763 A1 | 10/2019 | Lei |
| 2019/0313259 A1 | 10/2019 | Bendlin et al. |
| 2019/0313260 A1 | 10/2019 | Zhang |
| 2019/0313385 A1 | 10/2019 | Yang |
| 2019/0313419 A1 | 10/2019 | Fakoorian |
| 2019/0313430 A1 | 10/2019 | Manolakos |
| 2019/0319732 A1 | 10/2019 | Manolakos |
| 2019/0319767 A1 | 10/2019 | Sun |
| 2019/0320393 A1 | 10/2019 | Hosseini |
| 2019/0320402 A1 | 10/2019 | Ji |
| 2019/0320420 A1 | 10/2019 | Zhang |
| 2019/0320424 A1 | 10/2019 | Yerramalli |
| 2019/0320452 A1 | 10/2019 | Zhang |
| 2019/0320458 A1 | 10/2019 | Hosseini |
| 2019/0327047 A1 | 10/2019 | Liu |
| 2019/0327062 A1 | 10/2019 | Jiang |
| 2019/0334577 A1 | 10/2019 | Damnjanovic |
| 2019/0334666 A1 | 10/2019 | Damnjanovic |
| 2019/0335337 A1 | 10/2019 | Damnjanovic |
| 2019/0335445 A1 | 10/2019 | Forenza et al. |
| 2019/0335447 A1 | 10/2019 | Sarkis |
| 2019/0335456 A1 | 10/2019 | Yerramalli |
| 2019/0335480 A1 | 10/2019 | Sun |
| 2019/0335481 A1 | 10/2019 | Jiang |
| 2019/0335490 A1 | 10/2019 | Zeng |
| 2019/0335500 A1 | 10/2019 | Zhang |
| 2019/0335504 A1 | 10/2019 | Chakraborty |
| 2019/0342035 A1 | 11/2019 | Zhang |
| 2019/0342045 A1 | 11/2019 | Radulescu |

(56) References Cited

U.S. PATENT DOCUMENTS

| | | |
|---|---|---|
| 2019/0342836 A1 | 11/2019 | Ang |
| 2019/0349010 A1 | 11/2019 | Wu |
| 2019/0349176 A1 | 11/2019 | Li |
| 2019/0349221 A1 | 11/2019 | Jiang |
| 2019/0349897 A1 | 11/2019 | Hosseini |
| 2019/0349900 A1 | 11/2019 | Sarkis |
| 2019/0349941 A1 | 11/2019 | Yang |
| 2019/0349969 A1 | 11/2019 | Chakraborty |
| 2019/0349973 A1 | 11/2019 | Yang |
| 2019/0349974 A1 | 11/2019 | Sundararajan |
| 2019/0349992 A1 | 11/2019 | Zhang |
| 2019/0349998 A1 | 11/2019 | Bhattad |
| 2019/0356441 A1 | 11/2019 | Jiang |
| 2019/0356455 A1 | 11/2019 | Yang |
| 2019/0357150 A1 | 11/2019 | Wang |
| 2019/0357252 A1 | 11/2019 | Sun et al. |
| 2019/0357255 A1 | 11/2019 | Sun et al. |
| 2019/0363773 A1 | 11/2019 | Yerramalli et al. |
| 2019/0363853 A1 | 11/2019 | Soriaga |
| 2019/0364468 A1 | 11/2019 | Yerramalli et al. |
| 2019/0364579 A1 | 11/2019 | Zhang et al. |
| 2019/0372605 A1 | 12/2019 | Li |
| 2019/0372608 A1 | 12/2019 | Wei |
| 2019/0372712 A1 | 12/2019 | Yang |
| 2019/0373571 A1 | 12/2019 | Damnjanovic et al. |
| 2019/0373629 A1 | 12/2019 | Mukkavilli |
| 2019/0373640 A1 | 12/2019 | Sun et al. |
| 2019/0379485 A1 | 12/2019 | Jiang |
| 2019/0379518 A1 | 12/2019 | Yang |
| 2019/0379561 A1 | 12/2019 | Zhang et al. |
| 2019/0380052 A1 | 12/2019 | Yang |
| 2019/0380127 A1 | 12/2019 | Wang |
| 2019/0380147 A1 | 12/2019 | Zhang et al. |
| 2019/0386737 A1 | 12/2019 | Liu et al. |
| 2019/0387532 A1 | 12/2019 | Liu et al. |
| 2019/0393986 A1 | 12/2019 | Wang |
| 2019/0394008 A1 | 12/2019 | Chen et al. |
| 2019/0394772 A1 | 12/2019 | Li |
| 2019/0394790 A1 | 12/2019 | Damnjanovic et al. |
| 2020/0007160 A1 | 1/2020 | Li |
| 2020/0007294 A1 | 1/2020 | Yang |
| 2020/0007302 A1 | 1/2020 | Manolakos |
| 2020/0008107 A1 | 1/2020 | Zhang et al. |
| 2020/0008108 A1 | 1/2020 | Yoo |
| 2020/0008131 A1 | 1/2020 | Chakraborty et al. |
| 2020/0008235 A1 | 1/2020 | Sarkis |
| 2020/0008239 A1 | 1/2020 | Li |
| 2020/0014499 A1 | 1/2020 | Sun |
| 2020/0015268 A1 | 1/2020 | Zhang et al. |
| 2020/0021423 A1 | 1/2020 | Liu et al. |
| 2020/0022029 A1 | 1/2020 | Sadek et al. |
| 2020/0022136 A1 | 1/2020 | Wang |
| 2020/0029203 A1 | 1/2020 | Ekpenyong et al. |
| 2020/0029221 A1 | 1/2020 | Xue et al. |
| 2020/0029335 A1 | 1/2020 | Yang |
| 2020/0036476 A1 | 1/2020 | Yang |
| 2020/0036477 A1 | 1/2020 | Xu |
| 2020/0037235 A1 | 1/2020 | Ly |
| 2020/0037319 A1 | 1/2020 | Li |
| 2020/0037336 A1 | 1/2020 | Sun et al. |
| 2020/0037338 A1 | 1/2020 | Li |
| 2020/0037347 A1 | 1/2020 | Yang |
| 2020/0037352 A1 | 1/2020 | Yang |
| 2020/0044778 A1 | 2/2020 | Park |
| 2020/0044784 A1 | 2/2020 | Yang |
| 2020/0044793 A1 | 2/2020 | Sundararajan |
| 2020/0045556 A1 | 2/2020 | Xue |
| 2020/0045623 A1 | 2/2020 | Damnjanovic |
| 2020/0045744 A1 | 2/2020 | Sun |
| 2020/0052717 A1 | 2/2020 | Wang |
| 2020/0052750 A1 | 2/2020 | Manolakos |
| 2020/0052831 A1 | 2/2020 | Yang |
| 2020/0052870 A1 | 2/2020 | Yerramalli |
| 2020/0053599 A1 | 2/2020 | Damnjanovic |
| 2020/0053658 A1 | 2/2020 | Sundararajan |
| 2020/0053739 A1 | 2/2020 | Xue |
| 2020/0053744 A1 | 2/2020 | Hosseini |
| 2020/0053801 A1 | 2/2020 | Hosseini |
| 2020/0059346 A1 | 2/2020 | Yoo |
| 2020/0059854 A1 | 2/2020 | Li et al. |
| 2020/0059926 A1 | 2/2020 | Jiang |
| 2020/0067574 A1 | 2/2020 | Yang |
| 2020/0067639 A1 | 2/2020 | Lin |
| 2020/0067748 A1 | 2/2020 | Zhang |
| 2020/0068435 A1 | 2/2020 | Zhang |
| 2020/0068495 A1 | 2/2020 | Yang |
| 2020/0068528 A1 | 2/2020 | Abraham |
| 2020/0076563 A1 | 3/2020 | Yang |
| 2020/0077394 A1 | 3/2020 | Damnjanovic |
| 2020/0077439 A1 | 3/2020 | Sun |
| 2020/0083982 A1 | 3/2020 | Jiang |
| 2020/0083987 A1 | 3/2020 | Xu |
| 2020/0084759 A1 | 3/2020 | Liu |
| 2020/0084778 A1 | 3/2020 | Wang |
| 2020/0084784 A1 | 3/2020 | Jiang |
| 2020/0092041 A1 | 3/2020 | Sankar |
| 2020/0092818 A1 | 3/2020 | Jiang |
| 2020/0092909 A1 | 3/2020 | Ekpenyong |
| 2020/0099436 A1 | 3/2020 | Malik |
| 2020/0099469 A1 | 3/2020 | Jiang |
| 2020/0099472 A1 | 3/2020 | Wang |
| 2020/0099560 A1 | 3/2020 | Li |
| 2020/0100116 A1 | 3/2020 | Chakraborty |
| 2020/0100226 A1 | 3/2020 | Hosseini |
| 2020/0100247 A1 | 3/2020 | Zhang |
| 2020/0100250 A1 | 3/2020 | Zhang |
| 2020/0100257 A1 | 3/2020 | Yang |
| 2020/0106582 A1* | 4/2020 | Jalali .................... H04B 17/318 |
| 2020/0106583 A1* | 4/2020 | Zirwas .................. H04L 5/0051 |
| 2020/0107335 A1 | 4/2020 | Xue |
| 2020/0107336 A1 | 4/2020 | Yang |
| 2020/0107360 A1 | 4/2020 | Xue |
| 2020/0107364 A1 | 4/2020 | Xue |
| 2020/0112391 A1 | 4/2020 | Yang |
| 2020/0112394 A1 | 4/2020 | Mukkavilli |
| 2020/0112396 A1 | 4/2020 | Jiang |
| 2020/0112421 A1 | 4/2020 | Ang |
| 2020/0112964 A1 | 4/2020 | Yang |
| 2020/0112983 A1 | 4/2020 | Hosseini |
| 2020/0281007 A1 | 9/2020 | Sun et al. |
| 2020/0295980 A1 | 9/2020 | Bertrand et al. |
| 2020/0296762 A1 | 9/2020 | Sun et al. |
| 2020/0314691 A1 | 10/2020 | Chen et al. |
| 2020/0322202 A1 | 10/2020 | Hadani et al. |
| 2021/0160849 A1 | 5/2021 | Sun et al. |
| 2021/0184821 A1 | 6/2021 | Chen et al. |
| 2021/0215830 A1 | 7/2021 | Sahlin et al. |
| 2021/0219320 A1 | 7/2021 | Belleschi et al. |
| 2021/0258814 A1 | 8/2021 | Chandrasekhar et al. |
| 2021/0266131 A1 | 8/2021 | Ekpenyong |
| 2021/0266846 A1 | 8/2021 | Do et al. |
| 2021/0273770 A1 | 9/2021 | Ekpenyong et al. |
| 2021/0314962 A1 | 10/2021 | Ashraf et al. |
| 2021/0392620 A1 | 12/2021 | Ashraf et al. |
| 2021/0392707 A1 | 12/2021 | Do et al. |
| 2022/0029725 A1 | 1/2022 | Chen et al. |
| 2022/0030610 A1 | 1/2022 | Chen et al. |
| 2022/0070027 A1* | 3/2022 | Huang .................. H04B 7/0857 |
| 2022/0140936 A1 | 5/2022 | Sun et al. |
| 2022/0407569 A1* | 12/2022 | Zhang .................. H04B 7/086 |
| 2023/0006713 A1* | 1/2023 | Zirwas .................. H04B 7/01 |

OTHER PUBLICATIONS

Written Opinion for International Application No. PCT/US2021/056892 dated Mar. 21, 2022, 6 pages.

\* cited by examiner

CLUSTERING IN MULTIPLE-INPUT MULTIPLE-OUTPUT COMMUNICATION SYSTEMS

CROSS REFERENCE TO RELATED APPLICATIONS

This application claims the benefit of priority of U.S. Provisional Patent Application No. 63/108,170, filed Oct. 30, 2020 and titled "CLUSTERING AND/OR RATE SELECTION IN MULTIPLE-INPUT MULTIPLE OUTPUT COMMUNICATION SYSTEMS," the disclosure of which is hereby incorporated by reference herein in its entirety and for all purposes. The present disclosure relates to U.S. patent application Ser. No. 17/452,677, filed on even date herewith and titled "RATE SELECTION IN MULTIPLE-INPUT MULTIPLE OUTPUT COMMUNICATION SYSTEMS," the disclosure of which is hereby incorporated by reference herein in its entirety and for all purposes.

BACKGROUND

Technical Field

Embodiments of this disclosure relate to for wireless communication systems.

Description of Related Technology

In a wireless communication system, there can be a plurality of user equipments (UEs) and a plurality of remote radio units (RRUs) in a particular geographic area. Scheduling multiple-input multiple-output (MIMO) wireless communications between the UEs and the RRUs in a way that efficiently utilizes resources with relatively low interference can be computationally complex. Methods of determining RRUs to serve UEs with high throughput are desired. Methods of efficiently selecting rate and/or rank for UEs in a MIMO wireless communication environment are desired.

SUMMARY OF CERTAIN INVENTIVE ASPECTS

The innovations described in the claims each have several aspects, no single one of which is solely responsible for its desirable attributes. Without limiting the scope of the claims, some prominent features of this disclosure will now be briefly described.

One aspect of this disclosure is a method of interference aware clustering. The method includes forming a first cluster of first user equipments and first network nodes in a first section during a time slot, forming a second cluster of second user equipments and second network nodes in a second section during the time slot such that the first user equipments are protected from interference associated with the second cluster, and causing multiple-input multiple-output wireless communications during the time slot (a) from the first network nodes to the first user equipments and (b) from the second network nodes to the second user equipments. The first section has higher priority than the second section in the time slot;

The first network nodes can include first remote radio units, and the second network nodes can include second remote radio units.

Forming the second cluster can include excluding one or more dominant interfering network nodes in the second section from the second cluster. Forming the second cluster can include excluding one or more victim user equipments in the second section from the second cluster. The method can include assigning one or more dimensions in the second cluster for nulling to one or more victims of the first user equipments in the first cluster to reduce inter-cluster interference during the time slot.

Forming the first cluster can include sorting the first user equipments by user equipment priority and a selecting a network node to serve the highest priority user equipment of the first user equipments first. Forming the first cluster can include determining to stop forming the first cluster in response to a maximum number of user equipments being in the first user equipments. Forming the first cluster can include determining to stop forming the first cluster in response to no more network nodes in the first section being available for scheduling.

Forming the first cluster can include selecting a particular network node of the first network node to serve a user equipment of the first user equipments based on (i) a network node of the first network nodes with a highest channel quality measure for the user equipment being unavailable and (ii) the particular network node having a channel quality measure within a threshold of the highest channel quality measure.

The method can include determining (i) a network node of the first network nodes with a highest channel quality measure for each of the first user equipments and (ii) one or more other network nodes of the first network nodes with a channel quality measure within a threshold of the highest channel quality measure for each of the first user equipments, in which the first cluster in formed based on the determining. The method can include estimating a Sounding Reference Signal channel estimate between an antenna of a user equipment of the first user equipments and an antenna of a network node of the first network nodes, and computing an average of squared channel estimates of all antennas of the first network nodes and the antenna of the user equipment of the first user equipments. The determining can be based on the average of squared channel estimates.

The method can include forming clusters of user equipments and network nodes during a second time slot such that a cluster for the second section is protected from interference associated with a cluster for the first section, in which the second section has higher priority than the first section in the second time slot.

The method can include ordering a candidate layer set of layers for the first cluster, selecting a layer of the candidate set that satisfies one or more conditions, comparing a first sum rate of a selected layer set with a second sum rate of the layer together with the selected layer set, determining to include the layer in the selected layer set based on the comparing, and performing rate selection for the first user equipments of the first cluster based on the selected layer set.

The method can include selecting first ranks associated with the first user equipments, selecting second ranks associated with the second user equipments, determining one or more user equipments of the first user equipments to protect, computing precoding coefficients for the second cluster with nulling based on the second user equipments and the one or more user equipments of the first user equipments to protect, and causing wireless transmission from the second network nodes to the second user equipments using the precoding coefficients.

Another aspect of this disclosure is a network system with interference aware clustering. The network system includes network nodes and one or more baseband processing units. The network nodes are configured to wirelessly exchange information with user equipments. The network nodes include first network nodes in a first section and second network nodes in a second section. The one or more baseband processing unit are programmed to: form a first cluster of a first group of the user equipments and the first network nodes during a time slot; form a second cluster of a second group of the user equipments and the second network nodes during the time slot such that the first group of the user equipments are protected from interference associated with the second cluster, wherein the first section has higher priority than the second section in the time slot; and cause multiple-input multiple-output wireless communications during the time slot (a) from the first network nodes to the first group of the user equipments and (b) from the second network nodes to the second group of the user equipments.

The network nodes can include remote radio units. The one or more baseband processing units can include a distributed unit in accordance with a New Radio standard.

The one or more baseband processing units can be programmed to exclude one or more dominant interfering network nodes in the second section from the second group of the user equipments in forming the second cluster. The one or more baseband processing units can be programmed to exclude one or more victim user equipments in the second section from the second group of the user equipments in forming the second cluster. The one or more baseband processing units can be programmed to assign one or more dimensions in the second cluster for nulling to one or more victims of the first group of the user equipments in the first cluster to reduce inter-cluster interference.

Another aspect of this disclosure is a method of user equipment rate selection. The method includes ordering a candidate layer set of layers for a cluster comprising user equipments and network nodes, selecting a layer of the candidate set that satisfies one or more conditions, comparing a first sum rate of a selected layer set with a second sum rate of the layer together with the selected layer set, determining to include the layer in the selected layer set based on the comparing, and performing rate selection for user equipments of the cluster based on the selected layer set. The method is performed by a network system.

The network nodes can include remote radio units. The method can include causing wireless transmissions from the network nodes to the user equipments after the performing the rate selection.

The one or more conditions can include (a) being within a threshold number of layers from a beginning of the candidate set after the ordering and (b) having a lowest average correlation with layers already in the selected layer set.

The first and second sum rates can be weighted sums. The ordering can be based on an achievable rate of a single layer transmission. The rate selection can include modulation and coding scheme (MCS) selection.

The method can include iterating the selecting, the comparing, and the determining until a termination condition is satisfied. The second sum rate can be based on the sum rate from a previous iteration of the selecting, the comparing, and the determining.

Another aspect of this disclosure is a method of multi-cluster user equipment rate selection. The method includes selecting first user equipments and associated first ranks for a first cluster that includes the first user equipments and first network nodes, selecting second user equipments and associated second ranks for a second cluster that includes the second user equipments and second network nodes, determining one or more user equipments of the second user equipments to protect, computing precoding coefficients for the first cluster with nulling based on the one or more user equipments of the second user equipments to protect, and causing wireless transmission from the first network nodes to the first user equipments using the precoding coefficients.

The first network nodes can include first remote radio units. The second network nodes can include remote radio units.

The method can include performing rate selection for the first user equipments, and performing rate selection for the second user equipments. The performing rate selection for the first user equipments can be independent of the performing rate selection for the second user equipments. Alternatively, the performing rate selection for the first user equipments can account for interference from the second cluster.

The method can include computing the interference from the second cluster based on channel fadings and a calculated precoder coefficient. The interference from the second cluster can be associated with long term channel conditions.

The method can include allocating frequency and time resources to the first cluster and the second cluster prior to the selecting the first user equipments and associated ranks.

Selecting the first user equipments can account for interference from another cluster.

The method can include estimating a Sounding Reference Signal channel estimate between an antenna of a user equipment of the first user equipments and an antenna of a network node of the first network nodes, and computing an average of squared channel estimates of all antennas of the first network nodes and the antenna of the user equipment of the first user equipments, in which the selecting the first user is based on the average of squared channel estimates.

Another aspect of this disclosure is a network system with user equipment rate selection. The network system includes network nodes configured to wirelessly exchange information with user equipments and one or more baseband processing units in communication with the network nodes. The one or more baseband processing programmed to order a candidate layer set of layers for a cluster comprising the user equipments and the network nodes, select a layer of the candidate set that satisfies one or more conditions, compare a first sum rate of a selected layer set with a second sum rate of the layer together with the selected layer set, determine to include the layer in the selected layer set based on comparing the first sum rate with the second sum rate, perform rate selection for user equipments of the cluster based on the selected layer set, and cause wireless transmissions from the network nodes to the user equipments based on the rate selection.

The network nodes can include remote radio units. The one or more baseband processing units can include a distributed unit in accordance with a New Radio standard.

The one or more baseband processing units can be programmed to perform rate selection for a second cluster of second network nodes and second user equipments taking into account interference between the first cluster and the second cluster.

The one or more baseband processing units can be programmed compute precoding coefficients for the first cluster with nulling based on protecting one or more user equipments of a second cluster.

Another aspect of this disclosure is a method of determining Reference Signal Received Power (RSRP) between a user equipment and a remote radio unit. The method includes estimating a Sounding Reference Signal (SRS) channel estimate between an antenna at the user and an antenna at the remote radio unit, and computing an average of squared channel estimates of all antennas of the remote radio unit from the antenna of the user equipment. The method can be performed by a baseband processing unit of a network system.

The RSRP is a measure of a long term channel condition. The RSRP can be used to determine that the remote radio unit is an interfering remote radio unit. The RSRP can be used to determine that the user equipment is a victim of the remote radio unit. The RSRP can be used with clustering disclosed herein. For example, the RSRP can be used to determine which user equipments to protect in forming one or more clusters. As another example the RSRP can be used to determine strongly associated remote radio units and weakly associated RRUs. The RSRP can be used with user equipment rate selection disclosed herein. For example, the RSRP can be used as an indication on long term inter-cluster interference in rate selection.

Another aspect of this disclosure is non-transitory, computer-readable storage comprising computer-executable instructions, wherein the computer-executable instructions, when executed by a baseband processing unit, cause a method described in one or more of the preceding paragraphs of this summary action to be performed.

For purposes of summarizing the disclosure, certain aspects, advantages and novel features of the innovations have been described herein. It is to be understood that not necessarily all such advantages may be achieved in accordance with any particular embodiment. Thus, the innovations may be embodied or carried out in a manner that achieves or optimizes one advantage or group of advantages as taught herein without necessarily achieving other advantages as may be taught or suggested herein.

BRIEF DESCRIPTION OF THE DRAWINGS

Embodiments of this disclosure will now be described, by way of non-limiting example, with reference to the accompanying drawings.

DETAILED DESCRIPTION OF CERTAIN EMBODIMENTS

Figure 1A:
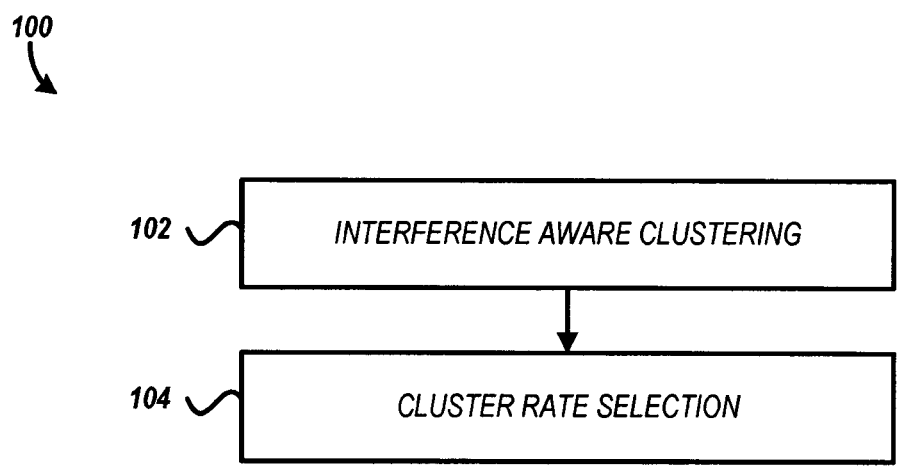
FIG. 1A is a flow diagram of an example method of clustering and rate selection according to an embodiment.

The following description of certain embodiments presents various descriptions of specific embodiments. However, the innovations described herein can be embodied in a multitude of different ways, for example, as defined and covered by the claims. In this description, reference is made to the drawings where like reference numerals can indicate identical or functionally similar elements. It will be understood that elements illustrated in the figures are not necessarily drawn to scale. Moreover, it will be understood that certain embodiments can include more elements than illustrated in a drawing and/or a subset of the elements illustrated in a drawing. Further, some embodiments can incorporate any suitable combination of features from two or more drawings. The headings provided herein are for convenience only and do not necessarily affect the scope or meaning of the claims.

This disclosure provides technical solutions related to clustering remote radio units (RRUs) and user equipments (UEs) in multi-user multiple-input multiple-output (MU-MIMO) systems. This disclosure provides technical solutions related to rate selection within one or more clusters in MU-MIMO systems.

FIG. 1A is a flow diagram of an example method 100 of clustering and rate selection. At block 102, interference aware clustering is performed. RRUs and UEs can be clustered into groups. RRUs and UEs within a section or geographical area can be clustered. Clustering can be performed for a plurality of different sections. The clustering can account for interference. The clustering at block 102 can be implemented in accordance with any suitable principles and advantages of clustering disclosed herein. Rate selection can be performed at block 104. The rate selection can be performed for each cluster determined at block 102. The rate selection can be single cluster rate selection in certain applications. The rate selection can be multi-cluster rate selection in some other applications. The rate selection at block 104 can be implemented in accordance with any suitable principles and advantages of rate selection disclosed herein.

Figure 1B:
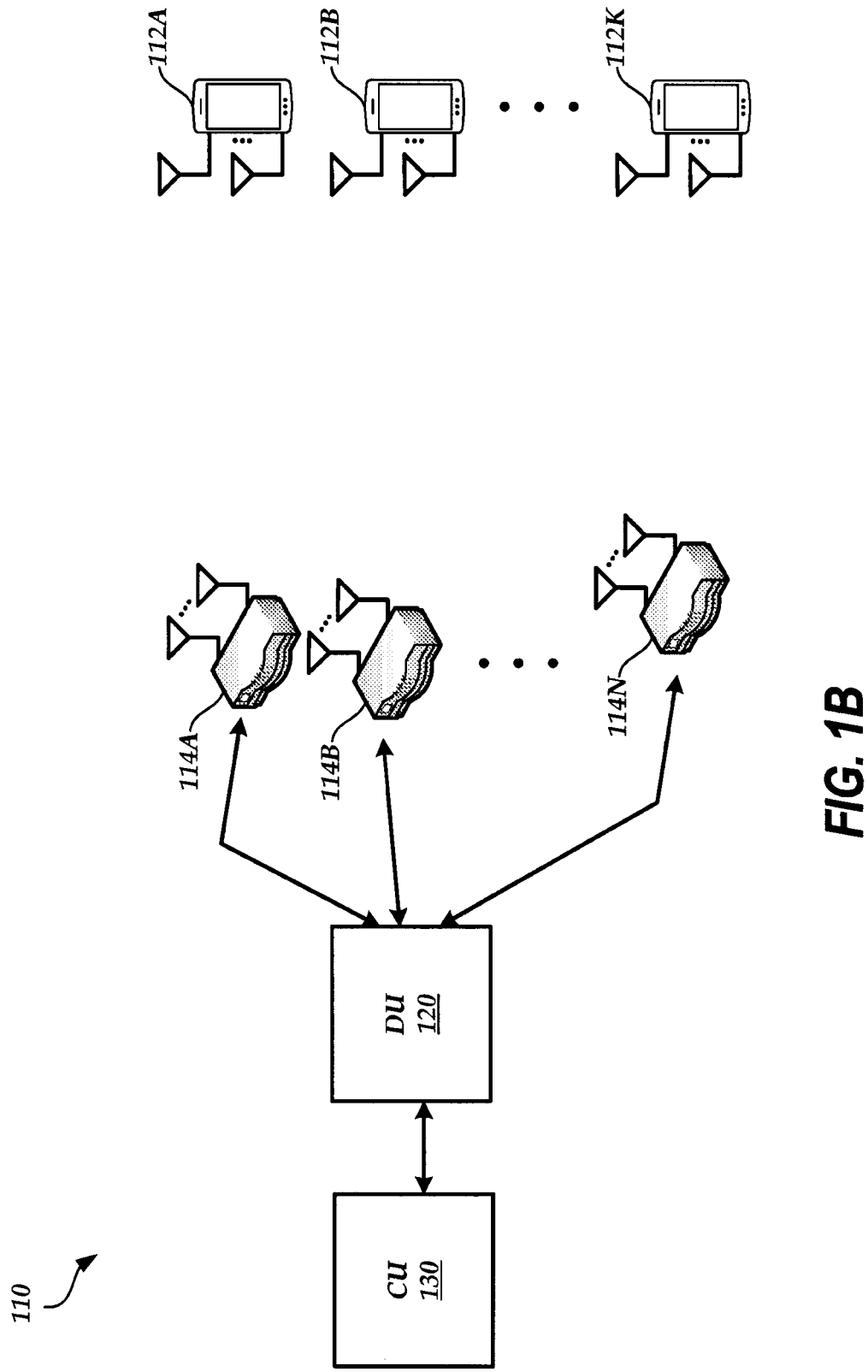
FIG. 1B is a schematic diagram illustrating an example multiple-input multiple-output (MIMO) network environment where clustering and/or rate selection can be performed in embodiments.

FIG. 1B is a diagram illustrating an example MIMO network environment 110 that includes UEs 112A-112K, RRUs 114A-114N, a distributed unit (DU) 120, and a centralized unit (CU) 130. In the MIMO network environment 110, UEs 112A-112K and RRUs 114A-114N can wirelessly communicate with each other. As illustrated, one or more RRUs 114A-114N can include multiple antennas. The RRUs 114A-114N can be serving nodes.

Aspects of this disclosure relate to achieving high throughput in the MIMO network environment 110. As illustrated, the RRUs 114A-114N are in communication with the DU 120. The DU 120 can implement any suitable features of a DU specified in a New Radio (NR) standard. The DU 120 can perform clustering and/or user rate selection in accordance with any suitable principles and advantages disclosed herein. The DU 120 can cluster UEs 112A-112K and RRUs 114A-114N in accordance with any suitable principles and advantages disclosed herein. The DU 120 can perform rate selection on one or more clusters that each include a subset of these UEs and RRUs in accordance with any suitable principles and advantages disclosed herein. In some instances, clustering and/or rate selection can be performed by two or more DUs. Two or more DUs can be in communication with the RRUs 114A-114N in some applications. The DU 120 is in communication with the CU 130. The CU 130 can implement any suitable features of a CU specified in a NR standard. In certain applications, the functions of the CU 130 and DU 120 can be combined into a single unit. In some applications, similar functions to the DU 120 and CU 130 can be performed by a baseband unit (BBU) in accordance with an LTE standard.

Various standards and/or protocols may be implemented in the MIMO network environment 110 to wirelessly communicate data between a RRU and a UE communication device. Some wireless devices may communicate using an orthogonal frequency-division multiplexing (OFDM) digital modulation scheme via a physical layer. Example standards and protocols for wireless communication in the network environment 110 can include the third generation partnership project (3GPP) Long Term Evolution (LTE), Long Term Evolution Advanced (LTE Advanced), 3GPP New Radio (NR) also known as 5G, Global System for Mobile Communications (GSM), Enhanced Data Rates for GSM Evolution (EDGE), Worldwide Interoperability for Microwave Access (WiMAX), and the IEEE 802.11 standard, which may be known as Wi-Fi. In some systems, a radio access network (RAN) may include one or more base stations associated with one or more evolved Node Bs (also commonly denoted as enhanced Node Bs, eNodeB s, or eNB s), gNBs, or any other suitable Node Bs (xNBs). In some other embodiments, radio network controllers (RNCs) may be provided as the base stations. A base station provides a bridge between the wireless network and a core network such as the Internet. The base station may be included to facilitate exchange of data for the wireless communication devices of the wireless network. A base station can perform clustering and/or rate selection is accordance with any suitable principles and advantages disclosed herein.

A UE of the UEs 112A-112K can include a device used by a user with wireless communication capabilities such as a smartphone, a laptop, a tablet computer, cellular telephone, a wearable computing device such as smart glasses or a smart watch or an ear piece, one or more networked appliances (e.g., consumer networked appliances or industrial plant equipment), an industrial robot with connectivity, or a vehicle. In some implementations, the UE may include a sensor or other networked device configured to collect data and wirelessly provide the data to a device (e.g., server) connected to a core network such as the Internet. Such devices may be referred to as Internet of Things devices (IoT devices). A UE may be referred to as a user herein. UEs may be referred to as users herein. A downlink (DL) transmission generally refers to a communication from a network system to a UE. An uplink (UL) transmission generally refers to a communication from the UE to the network system.

Although features may be disclosed with reference to users or UEs, any suitable principles and advantages disclosed herein can be implemented with any suitable wireless communication devices. As one example, clustering and/or rate selection can alternatively or additionally be applied to a network device and a network node. For instance, the network device can be an integrated access and backhaul (IAB) node and the network node can be an IAB donor. Although features may be disclosed with reference to RRUs, any suitable principles and advantages disclosed herein can be implemented with any suitable serving nodes.

Figure 1C:
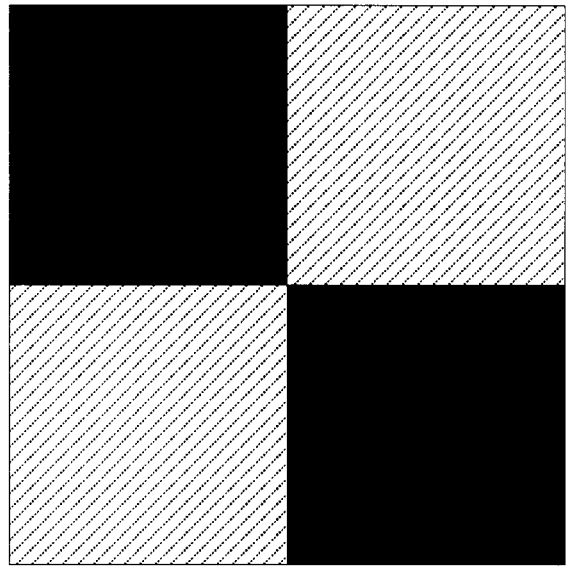
FIGS. 1C and 1D are schematic diagrams of example sections in different time slots.
Figure 1D:
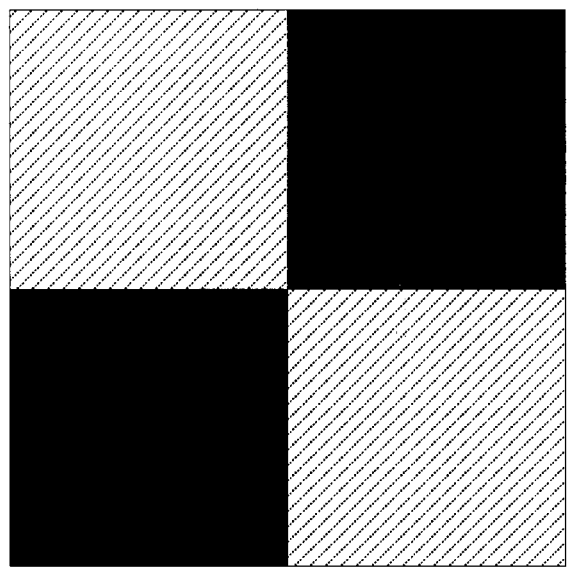

FIGS. 1C and 1D illustrate example sections in different time slots. In this example, sections can have a pattern similar to a chess board. Any other suitable sections can be defined. The highest priority sections during a time slot have dark solid shading in FIGS. 1C and 1D. The lower priority sections during the time slot have a diagonal pattern shading in FIGS. 1C and 1D. FIGS. 1C and 1D illustrates that highest priority and lower priority can switch among time slots. For example, FIG. 1C can indicate priority in a first time slot and FIG. 1D can indicate priority in a second time slot following the first time slot.

Interference Aware Clustering

In a MU-MIMO environment, there can be multiple UEs and multiple RRUs. Interference aware trivial user grouping algorithms (ITUGAs) can form clusters of RRUs and UEs in a MU-MIMO environment. Multi-cluster methods can form clusters of RRUs each serving a group of users. The RRUs can exchange wireless communications that are overlapping in time and/or frequency. The clusters can be formed to increase overall system throughput in one or more time slots.

Multiple sections or geographic areas can each include of a group of users and a group of RRUs in a wireless communication environment. A section can correspond to a particular geographic area. A cluster of RRUs can be formed in each section. The cluster of RRUs can serve a group of users in the same area. Clustering methods can determine how to turn on the RRUs and grow clusters in each area. With an ITUGA, groups of sections with relatively low interference between the groups can be formed. For each time and frequency, one of the groups of sections can have higher priority and users in these groups should be protected from interference associated with one or more other groups of other sections. Which users to protect can be determined by Reference Signal Received Power (RSRP), another indication of channel quality, or any other suitable parameter. In certain applications, RRUs in lower priority groups can be on only if such RRUs are not causing a significant interference on wireless communications associated with higher priority groups. Although example clustering methods may be described with reference to clusters being divided into two groups, any suitable principles and advantages of these clustering methods can be applied to applications where clusters are divided into three or more groups.

Figure 2:
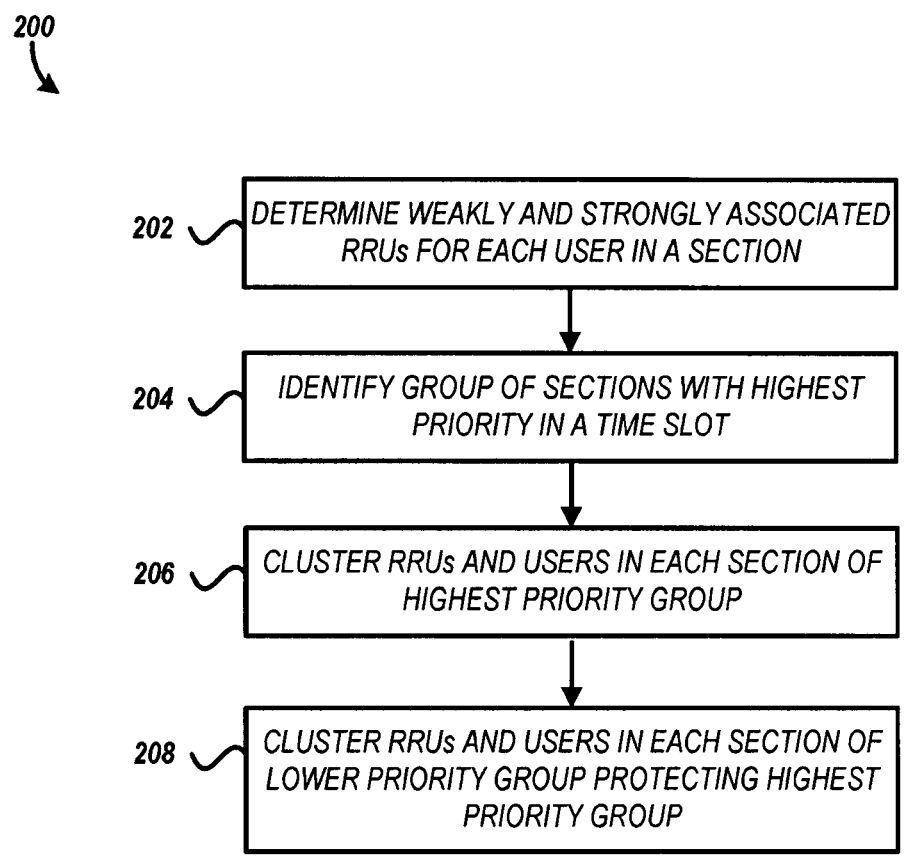
FIG. 2 is a flow diagram of an example method of clustering according to an embodiment.

FIG. 2 is a flow diagram of an example method 200 of clustering according to an embodiment. In the method 200, clusters of RRUs that overlap in frequency and time each serving users can be formed. At block 202, weakly and strongly associated RRUs can be determined for each user in a section. A strongly associated (SAS) RRU can be the RRU with a highest measure of channel quality, such as channel gain, for a user. A weakly associated (WAS) RRU of a user can be an RRU with a channel gain or other measure of channel quality within a threshold $\delta_1$ of the strongest channel of the user. There can be a plurality of WAS RRUs for a user in a section in certain instances. The WAS and SAS RRUs can be determined for users in a plurality of sections. The WAS and SAS RRUs can be determined based on Reference Signal Received Power (RSRP). RSRP can be measured at a RRU, for example, as described in more detail below. A best channel can have a strongest signal.

A group of sections with the highest priority in a time slot can be identified at block 204. One or more other groups of sections with lower priority in the time slot can be identified. The highest priority typically switches between groups of sections for different time slots. A highest priority group in one time slot can become a lower priority group in a subsequent time slot.

A set of RRUs and users in each section of the highest priority group can be clustered at block 206. More details of an embodiment of this clustering will be described with reference to FIG. 3. Clustering of each section with highest priority can be performed in parallel. A set of RRUs and users in each section of the lower priority group can be clustered so as to protect the highest priority group at block 208. This can involve turning off RRUs of the lower priority group that are dominant interferers of users in the higher priority group. Clustering RRUs and users at block 208 can involve protecting users of the lower priority group that are victims of RRUs of the cluster for the higher priority group. RRUs of a lower priority group without significant interference with any highest priority group can be clustered at block 208. More details of an embodiment of this clustering will be described with reference to FIG. 4. Clustering of each section with lower priority can be performed in parallel. After forming clusters in highest priority sections and the lower priority sections for a time slot, wireless communications can be scheduled for the clusters in the time slot.

Figure 3:
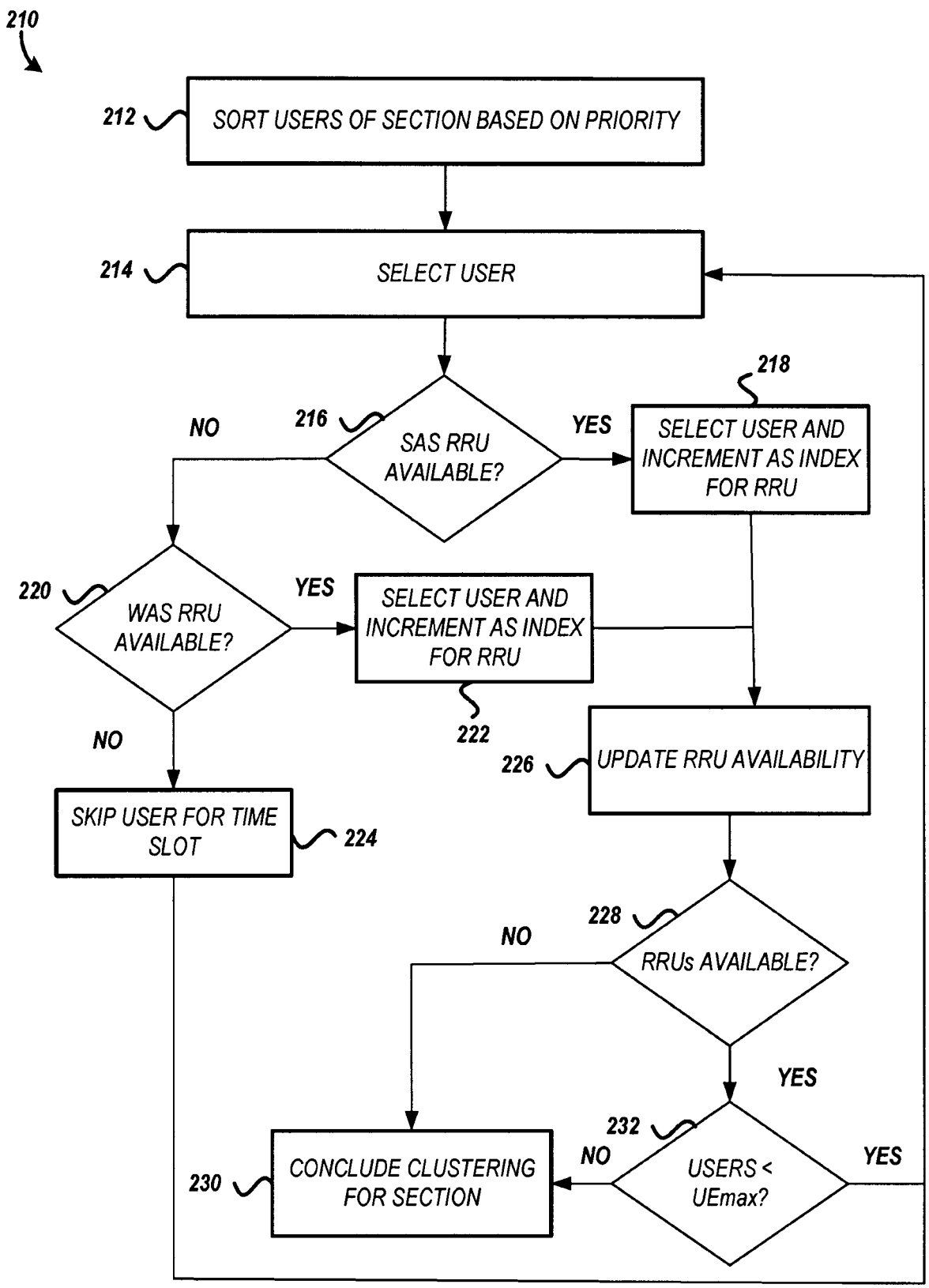
FIG. 3 is a flow diagram of an example method of clustering network nodes and users in a section with higher priority according to an embodiment.

FIG. 3 is a flow diagram of an example method 210 of clustering RRUs and users in a section with the highest priority according to an embodiment. The method 210 can be performed at block 206 of the method 200. The method 210 can be performed for each section with the highest priority in a time slot in a wireless communication environment.

At block 212, users of a section can be sorted based on a user priority. A user can be selected based on its priority at block 214. The highest priority user can be selected first. The next highest priority user can be selected in a next iteration.

Whether a SAS RRU of the selected user is available can be determined at block 216. If the SAS RRU of the selected user is available, the user can be selected to be scheduled with the SAS RRU at block 218. The number of users in a cluster assigned to an RRU in the cluster is defined by an association set (AS) index of the RRU. The AS index is less than or equal to a maximum index $AS_{max}$. The AS index for the SAS RRU of the selected user can be incremented at block 218.

If the SAS RRU of the selected user in unavailable, whether a WAS RRU of the selected user is available can be determined at block 220. When one or more WAS RRUs of the selected user are available, a WAS RRU with a highest channel gain or other measure of channel quality, such as RSRP, can be selected to serve the selected user at block 222. The AS index for the WAS RRU can be incremented at block 222. When neither the SAS RRU nor a WAS RRU is available to the selected user, the selected user can be skipped and not scheduled for the time slot at block 224. Then the method can return to block 214. The next highest user can then be selected at block 214.

After an RRU is selected to serve the selected user at block 218 or block 222, the availability of the selected RRU can be updated at block 226. An RRU can be unavailable if the AS index for that RRU reaches $AS_{max}$. If it is determined that there are no more RRUs available at block 228, clustering can be concluded in the section at block 230. On the other hand, if one or more RRUs are determined to be available at block 228, the number of users scheduled in the cluster can be compared to a maximum number of users $UE_{max}$ to schedule in the cluster at block 232. When the number of users scheduled reaches the maximum number of users $UE_{max}$, the clustering for the section can be concluded at block 230. Accordingly, clustering can be concluded for the section when RRUs of the section are no longer available and/or when a maximum number of users are scheduled.

When one or more RRUs are available and the number of users scheduled is less than a maximum number of users $UE_{max}$, the method can return to block 214. The next highest user can then be selected at block 214 and another iteration of the method 210 can be performed.

Figure 4:
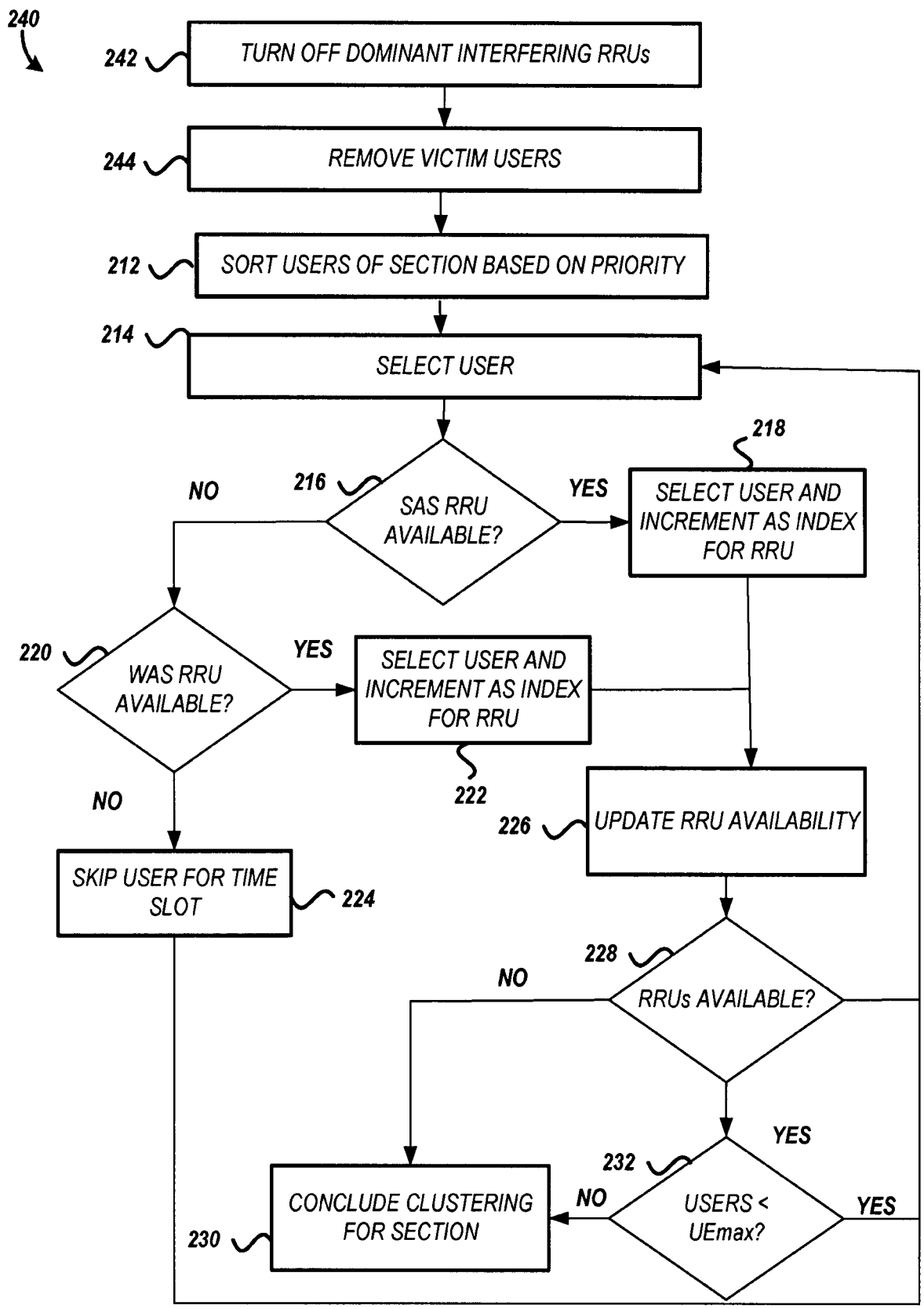
FIG. 4 is a flow diagram of an example method of clustering network nodes and users in a section with lower priority according to an embodiment.

FIG. 4 is a flow diagram of an example method 240 of clustering RRUs and users in a section with lower priority according to an embodiment. The method 240 can be performed at block 208 of the method 200. The method 240 can be performed for each section with the lower priority in a time slot in a wireless communication environment.

If a long-term channel gain, such as a RSRP, between RRU g and user u are within a threshold $\delta_2$ of the long-term channel gain between user u and its associated RRU, RRU g is a dominant interferer of user u and user u is a victim of RRU g. At block 242, RRUs that are dominant interferers of scheduled users in the highest priority group can be turned off. The availability of these RRUs can be set to zero. Users that are victims of the RRUs that are on in the highest priority group can be removed from a list of candidate users for the time slot at block 244. Accordingly, dominant interfering RRUs and victim users from the lower priority group can be inactive during the time slot. Thus, interference among the highest priority group and the lower priority group can be accounted for in clustering RRUs and users in a section for a time slot. In some other embodiments, either dominant interfering RRUs or victim users from the lower priority group can be inactive during the time slot.

The remaining users and RRUs for the lower priority group can then be processed similarly to the higher priority group. If a SAS RRU of a user is available, the user can be selected to be scheduled with the SAS RRU and the AS index can be increased for that RRU at block 218. If the SAS RRU of the user is not available, then whether any of the WAS RRUs are available can be determined at block 220. Among any available RRUs of WAS RRUs, the WAS RRU with the highest channel gain can be chosen to serve the user and the AS index for that RRU can be increased at block 222. If no SAS or WAS RRUs are available for the user, the user can be skipped for scheduling during the time slot at block 224. The availability of the RRUs in the section can then be updated. An RRU can be unavailable if the AS index for that RRU reaches the $AS_{max}$. If there are no more RRUs available as determined at block 228, clustering can be concluded in this section at block 230. The number of scheduled users in the cluster can be compared to the maximum number of users $UE_{max}$ for the cluster at block 232. If the number of users reaches the maximum number of users $UE_{max}$, clustering can be concluded in the section at block 230.

Figure 5:
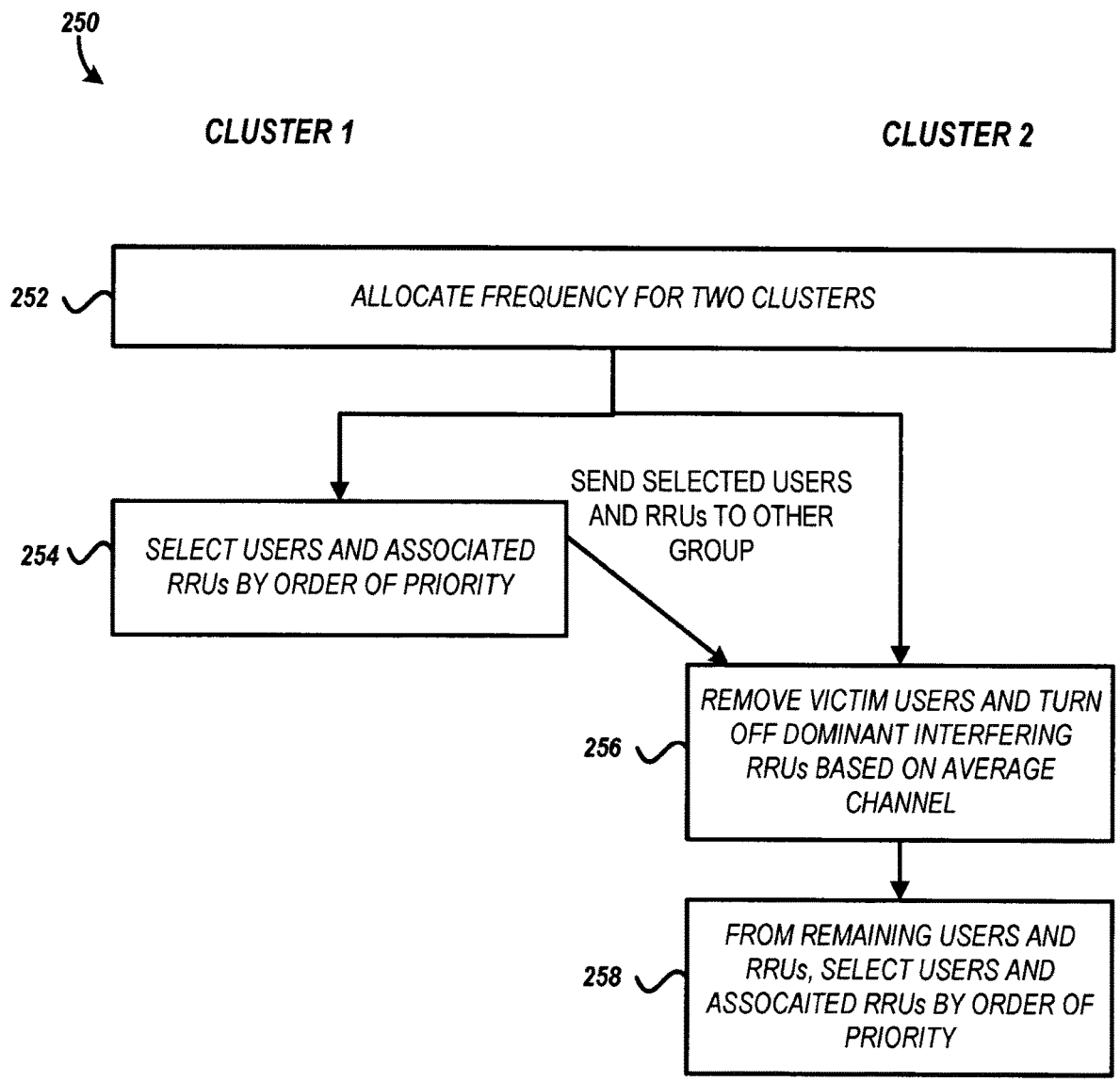
FIG. 5 is a flow diagram of an example method of clustering according to an embodiment.

FIG. 5 is a diagram illustrating a method 250 of clustering according to an embodiment. Frequency can be allocated among clusters at block 252. Frequency can overlap for the clusters.

For a first section with highest priority, users and associated RRUs can be selected based on the order of user priority at block 254. A highest priority user can be scheduled with a SAS RRU. The next highest user can be scheduled with a RRU of the available RRUs with a highest channel gain. Users can be scheduled with RRUs until no more RRUs are available and/or a maximum number of users are scheduled.

Then information identifying selected users and RRUs of the highest priority section in a time slot can be provided for clustering a lower priority section in the time slot. In the second section, victim users can be removed and/or dominant interfering RRUs can be turned off based on an average channel estimates at block 256. Users of the remaining users can be scheduled with RRUs of the remaining RRUs by the order of user priority at block 258.

In embodiments, all available beams can be used for wireless communication. According to some other embodiments, after clustering of RRUs with UEs, one or more particular beams can be selected using interference aware beam selection. Weights for RRUs and/or precoding can be determined to reduce interference.

Interference Aware Clustering Integrated with Nulling

Interference aware clustering can include integrated nulling. For integrated nulling, a fixed portion of extra dimension(s) in each cluster can be used to null top victims outside the cluster, reduce inter-cluster interference, increase overall throughput, or any combination thereof. The number of dimensions available for nulling can be a fixed ratio of the number of RRUs in a particular cluster. For interference aware clustering with integrated nulling, no further user and rank selections are applied in certain applications.

The method 200 of FIG. 2 can be performed with integrated nulling. The operations at blocks 202 and 204 can be implemented in accordance with any suitable principles and advantages discussed with reference to FIG. 2. The operations at block 206 and 208 can include integrated nulling features.

After a set of RRUs and users in each section of the highest priority group is clustered at block 206, integrated nulling operations related to the highest priority group can be applied at block 206. A number of available nulling dimensions in a cluster i can be computed after a set of RRUs is selected as part of the cluster i. The available nulling dimensions $N_{null}^i$ for a cluster i can have a maximum value of $N_{null}^i$=round ($\alpha \times \#RRU_i$), where $\alpha$ is a design parameter. From the selected users in the highest priority group outside cluster i, a set of users $V_i$ that are the victims of cluster i can be created. $U_{null}^i$ is a set of users outside cluster i that cluster i chooses to null a signal to. The number of layers assigned to a user is L. The top $$K = \min\left(\frac{N_{null}^i}{L}, \text{length}(V_i)\right)$$

with highest priority from $V_i$ can be added to $U_{null}^i$ and $N_{null}^i = N_{null}^i - L \times K$ can be updated.

As discussed above, a set of RRUs and users in each section of the lower priority group can be clustered so as to protect the highest priority group at block 208 of the method 200. Clustering RRUs and users in each section of the lower priority group can involve integrated nulling. Integrated nulling features can be implemented with different operations than the method 240 of FIG. 4. For each section in the lower priority group, the following operations can be performed in any suitable order to implement clustering with integrated nulling.

A set of RRUs of the lower priority section with enough dimension to null to all their victims in the highest priority group can be turned on. Selecting RRUs to turn on for nulling can involve sorting RRUs based on the number of their victims in the highest priority group, growing a set of RRUs by adding RRUs with the same order, an RRU can be added only if after adding that RRU the cluster can null to all its victims, otherwise the next RRU can be evaluated. In some other applications, selecting RRUs to turn on for nulling can involve including all RRUs in the section in a set and the RRUs can be removed one by one, each time removing the RRU that has the most distinct victims until the number of available nulling dimensions is equal or more than the number of victims.

Users for the lower priority section can be selected based on their priority. A highest priority user can be selected first. Then a next highest priority user can be selected. Whether the selected user is in a victim group of RRUs in the highest priority group can be determined. If the selected user is in the victim group, then it can be determined whether the clusters of dominant interferers have enough dimension to null to the selected user. If there is not enough dimension, the user can be skipped. Otherwise, if there is sufficient dimension, it can be determined whether a SAS RRU of the selected user is available. If the SAS RRU is available, the SAS RRU can be select the user to be scheduled and increase the AS index for that RRU. This user can also be added to the nulling list of all its dominant interferer clusters and the nulling availability of the dominant interferer clusters accordingly. If the SAS RRU of the selected user is not available, it can be determined whether any of the WAS RRUs are available. Among any available WAS RRUs, the one with the highest channel gain channel can be selected for scheduling the user and the AS index for that RRU can be increased. The user can be added to the nulling list of all its dominant interferer clusters and their nulling availability can be adjusted accordingly. If no SAS RRU or WAS RRU for the selected user is available, scheduling the selected user can be skipped for this time slot.

The availability of RRUs of the section can be updated. An RRU can be unavailable when the AS index for that RRU reaches the $AS_{max}$. If there are no more RRUs available, clustering can be concluded in the section. A number of scheduled users in can be compared to a maximum number of users $UE_{max}$ for scheduling. The next user can be selected if the number of scheduled users is less than the maximum number of users $UE_{max}$ for scheduling. On the other hand, when number of scheduled users reaches the maximum number of users $UE_{max}$ for scheduling, clustering can be concluded for the section. Accordingly, clustering in the section can be concluded when no more RRUs are available and/or when a maximum number of users has been scheduled.

Single Cluster Rate Selection

After RRUs and users have been clustered, user rate selection can be performed in each cluster. Such clustering can be implemented in accordance with any suitable principles and advantages disclosed herein. Efficient user and rank selection methods for a single cluster that achieve a desirable balance between performance and complexity are disclosed.

Figure 6:
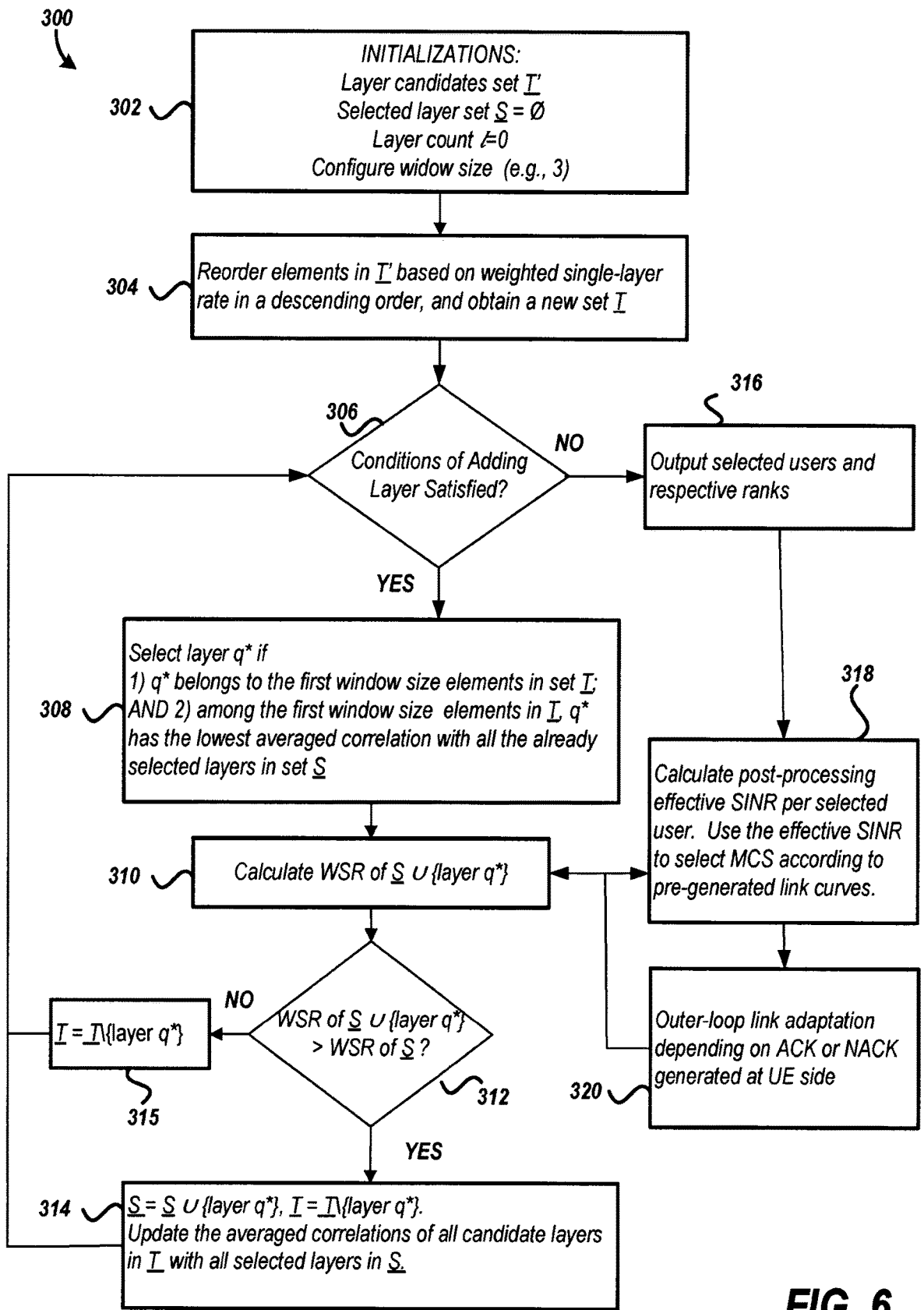
FIG. 6 is a flow diagram of an example method of single cluster user rate selection according to an embodiment.

FIG. 6 is a flow diagram of an example method 300 of a single cluster user rate selection according to an embodiment. The method 300 can be performed at block 104 of the method 100 of FIG. 1A. The method 300 can be performed for one or more clusters in a wireless communication environment. In the method 300, blocks 302, 304, 306, 308, 310, 312, 314, 315, and 315 relate to user and rank selection; block 318 relates to Modulation and Coding Scheme (MCS) selection; and block 320 relates to outer-loop link adaption.

At block 302, parameters for user rate selection can be initialized. Such parameters can include a layer candidate set T', a selected layer set S, a layer count l and a window size w. The candidate layer set T' can include candidate layers for wireless communications in the cluster. The selected layer set S can be initialized to be a null set. The layer count l can be initialized to 0. The window size w can be initialized to any suitable number, such as 3.

The candidate layer set T' can be reordered at block 304. The reordered candidate layer set T can be ordered in descending order of priority. In certain applications, transmission layers are reordered. The order can be determined based a weighted single-rate layer in various applications.

If it is determined that one or more layers can be added at decision block 306, the method 300 can proceed to evaluate whether a particular candidate layer from the reordered candidate layer set T increases a sum rate, such as a weighted sum rate, in the cluster.

A layer $q^*$ that satisfies a set of one or more conditions is selected at block 308. As discussed above, a window size w can be set at block 302. The window size w can represent a sliding window. The window size w can be used to limit the number of layers and/or users for consideration in an iteration of the method 300. A set of conditions for selecting the layer $q^*$ can include (1) the selected layer $q^*$ belonging to the first w elements of the ordered set T and (2) among the first w elements of set T, layer $q^*$ has the lowest averaged correlation with all the already selected layers. Any other suitable conditions can alternatively or additionally be used for selecting the layer $q^*$.

A sum rate, such as a weighted sum rate (WSR), of union (S, {$q^*$}) can be calculated at block 310, where set S includes all of the already selected layers. A WSR can be independently calculated during each iteration of the method 300. In some other applications, a WSR can be calculated in an iterative manner based on the WSR calculated from the previous iteration. With iterative precoder calculation, iterative WSR calculation can be implemented.

The sum rate, such as the WSR, with the layer $q^*$ can be compared to a previous sum rate at block 312. The previous sum rate is the sum rate of the selected layer set S. Based on the comparison, the layer $q^*$ can be either effectively selected or discarded. The comparison can involve a WSR or an unweighted sum rate.

If the calculated sum rate is larger than the previous sum rate, the layer $q^*$ increases the sum rate. In certain instances, the layer $q^*$ can be considered effectively selected when the calculated WSR is greater than the previous WSR. The layer $q^*$ can be considered effectively selected when the calculated WSR is greater than the previous WSR by a pre-determined amount in various applications. This can ensure that the layer $q^*$ provides a sufficient increase in WSR to be effectively selected. After the layer $q^*$ is effectively selected, the layer $q^*$ can be added to the selected layer set at block 314. The method 300 can return to block 306 after block 314 and a next iteration of the method 300 can be performed.

If the calculated sum rate is less than or equal to the previous sum rate, the layer $q^*$ can be discarded and not included in the selected layer set S in certain applications. If the calculated WSR is not greater than the previous WSR by a pre-determined amount, the layer $q^*$ can be discarded and not included in the selected layer set S in various applications. When the layer $q^*$ is discarded, the layer $q^*$ can be removed from the candidate set T. After the layer $q^*$ is discarded, the method 300 can return to block 306 and a next iteration of the method 300 can be performed.

When the layer $q^*$ is considered an effectively selected layer, the selected layer set S and the candidate layer set T can be updated at block 314. The layer $q^*$ can be added to the selected layer set S and removed from the candidate layer set T. Averaged correlation coefficients of all candidate layers in the candidate layer set T with all the selected layers in the selected layer set S can be calculated at block 314. The averaged correlation coefficients can be independently calculated each iteration. The averaged correlation coefficients can be calculated in an iterative manner based on the correlation coefficients from the previous iteration. Iterative calculation of averaged correlation coefficients can reduce complexity.

When the layer $q^*$ is not an effectively selected layer, the candidate layer set T can be updated at block 315 to remove the layer $q^*$. After the layer $q^*$ is removed from the candidate layer set T at block 315 or block 314, the method 300 can return to block 306.

The method 300 can iterate blocks 308 to 314 or 315 until a termination condition is satisfied. At decision block 306, whether one or more termination conditions are satisfied is determined. A termination condition can be satisfied if the candidate layer set T is empty, the number of layers in the selected layers set S corresponds to a total number of transmit antennas, or a number of layers in the selected layers set S corresponds to a pre-configured maximum number of scheduled layers. Any other suitable termination condition can alternatively or additionally be checked at block 306. If a termination condition is not satisfied, the method 300 can proceed to block 308. On the other hand, if a termination condition is satisfied, the method 300 can proceed to block 316. At block 316, information identifying users and respective ranks of the users is output. The rank can be the number of layers for wirelessly communicating with the user.

At block 318, rate selection can be determined per user. Rate selection can involve determining a Modulation and Coding Scheme (MCS) per user. Rate selection can be determined by channel quality feedback from a user, equivalent multi-user channel with precoder, the like, or any suitable combination thereof. In certain applications, post processing effective signal-to-interference-plus-noise ratio (SINR) can be calculated per user. Then the effective SINR can be used to select MCS, for example, according to pre-generated link curves.

Outer loop link adaptation can be performed at block 320. The link adaptation can be based on an acknowledgement (ACK) or a negative acknowledgement (NACK) generated at a UE side.

Figure 7:
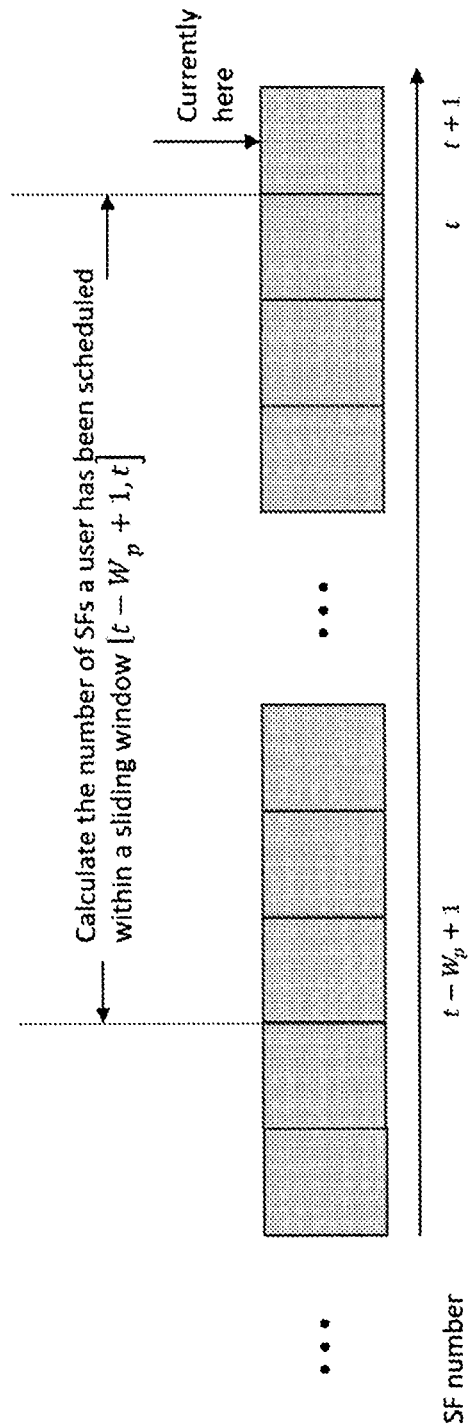
FIG. 7 is an illustration related to calculating a number of subframes a user is scheduled in during a sliding window.

In the method 300, layers can be added one by one. In some other embodiments, users can be added one by one instead of layers. In such embodiments, the number of transmission layer(s) per user can be pre-determined. Weights of users can be used for a weighted sum rate calculation in such embodiments. User weights can be determined a variety of ways. For example, a weight of a user can be inversely proportional to the user's previously experienced throughput, with or without a pre-configured sliding time window. As another example, a weight of a user can be inversely proportional to the number of time units (e.g., subframes or slots) the user has been scheduled during a pre-configured sliding time window with size Wp. FIG. 7 provides an illustration related to calculating a number of subframes a user is scheduled in during a sliding window. In certain applications, the number of time units when the user has successful transmissions (e.g., ACK) during the sliding time window is considered for determining the weight of the user.

Multi-Cluster Rate Selection

Single cluster user and rank selection algorithms can be extended to multiple clusters with coordination among the multiple clusters. When multiple clusters have wireless communications that overlap in frequency and time, inter-cluster interference nulling can be utilized to protect users from the interference from one or more other clusters. A single cluster user and rank selected algorithm is a low-complexity and robust layer and user selection algorithm. The single cluster user and rank selected algorithm can be denoted as lu-square in the following description. For illustrative purposes, multi-cluster rate selection may be discussed with reference to a 2 cluster scenario. Any suitable principles and advantages of multi-cluster rate selection disclosed herein can be applied to rate selection for 3 or more clusters.

Multi-cluster rate selection methods can include frequency allocation for a plurality of clusters, user and rank selection per cluster, and rate selection per user. The user and rank selection can identify a list of protected users in clusters. The rate selection per user can be based on user and rate selection for the cluster and the protected users identified by one or more other clusters.

Figure 8:
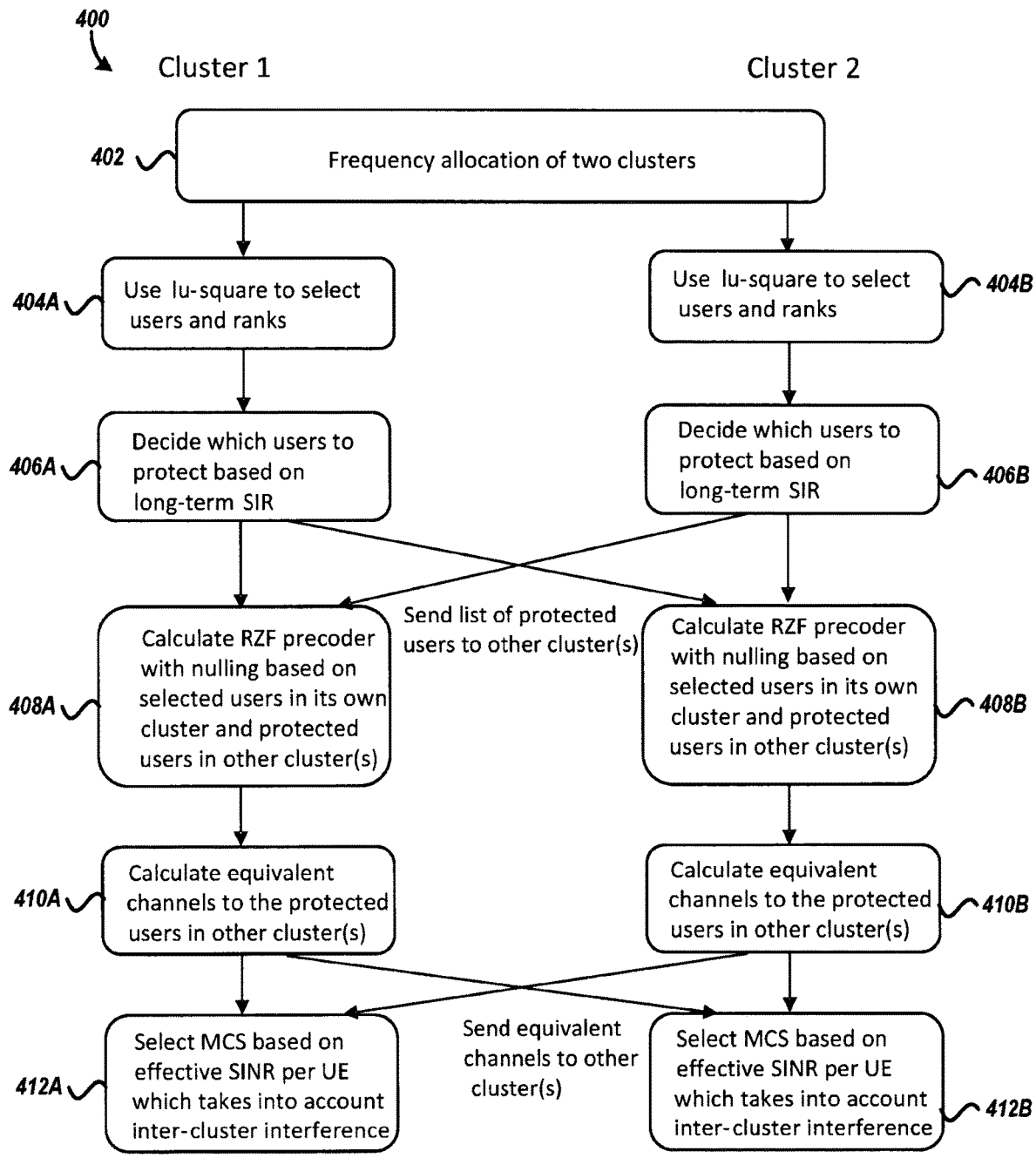
FIG. 8 is a flow diagram of an example method of multi-cluster user rate selection according to an embodiment.

FIG. 8 is a flow diagram of an example method 400 of multi-cluster user rate selection according to an embodiment. The method 400 can be performed at block 104 of the method 100 of FIG. 1A, for example.

At block 402, frequency can be allocated for a plurality of clusters. Frequency is allocated for two clusters in the method 400. The clusters can have frequency allocated by non-overlapping frequency division multiplexing (FDM). With FDM, there may be no significant inter-cluster interference and nulling may not be implemented. The clusters can have frequency allocated with completely or partially overlapping frequency. In this case, there can be inter-cluster interference and nulling can be implemented. Frequency allocation per cluster can be determined by one or more of a number of associated users per cluster, buffer occupancies per cluster, channel conditions per cluster, an estimated inter-cluster interference situation, or the like.

After frequency is allocated, user and rank selection can be performed per cluster. Rank can represent a number of layers or dimensions for wireless communication with a user. User and rank selection can be performed for a first cluster at block 404A. User and rank selection can be performed for a second cluster at block 404B. Lu-square can be used to select users and ranks at block 404A and/or 404B. Lu-square can be implemented in accordance with any suitable principles and advantages of the user and rank selection discussed with reference to FIG. 6. At block 406A, which users and/or layers to protect can be determined. The users and/or layers to protect can be within the first cluster. The users and/or layers to protect can be protected from the first cluster. Similarly, which users and/or layers to protect in the second cluster and/or to protect from the second cluster can be determined at block 406B. Which users and/or layers to protect can be determined based on a long-term signal interference ratio (SIR), such as SIRN and/or SINR.

In applications where nulling is not implemented, user and rank selection per cluster can be conducted independently for each cluster.

When nulling between clusters is implemented, lu-square can be applied for each cluster and which layers to protect can be determined. User and rank selection and determining users to protect can be performed in any suitable order.

In an embodiment, lu-square is applied first and then the protected layers inside the cluster are determined. In this case, no inter-cluster interference is considered in the WSR calculation of lu-square.

According to another embodiment, lu-square is applied first and then the layers outside the cluster to be protected from this cluster are determined. In this case, no inter-cluster interference is considered in the WSR calculation of lu-square.

In another embodiment, the protected layers are determined first and then lu-square is applied. In this case, inter-cluster interference can be considered in the WSR calculation of lu-square. The protected layers can be determined, for example, by long-term SINR and/or SIR or users' physical locations. The determined protected layers may or may not affect the layer candidate layers of lu-square, which is an input to lu-square. As an example, after determining the protected layers, only the layers that are 'parallel' to the protected layers in terms of the channels from the other cluster can be considered in certain applications. Accordingly, the interference from the other cluster to the non-protected layers can be reduced as well.

The considered inter-cluster interference can be short-term. Short term interference can be obtained based on large and small scale channel fadings and a (temporarily) calculated precoder. The considered inter-cluster interference can be long-term. Long term interference can be obtained based on one or more long-term channel conditions (e.g., RSRP). Both long term and short term inter-cluster interference can be considered in certain applications.

User and rank selection for the plurality of clusters can be conducted in parallel. User and rank selection for the plurality of clusters can be conducted in sequence. User rank and selection for the plurality of clusters can be performed partly in parallel and partly in sequence.

After user and rank selection, user rate selection can be performed for each selected user. Rate selection can involve determining Modulation and Coding Scheme (MCS) per user.

MCS selections of users can be conducted independently for each cluster. In this case, the selection in one cluster does not consider the interference from the other cluster(s).

Alternatively, MCS selections of users can be conducted jointly for the plurality of clusters. In this case, the selection in one cluster considers the interference from the other(s). In one embodiment, the considered inter-cluster interference is short-term. Short term inter-cluster interference can be obtained based on large and small scale channel fadings and the calculated precoder. In another embodiment, the considered inter-cluster interference is long-term. Long term inter-cluster interference can be obtained based on long-term channel conditions (e.g., RSRP).

In the method 400, precoder coefficients (e.g., regularized zero-forcing (RZF) precoder coefficients) can be calculated for the first cluster with nulling based on selected users in the first cluster and protected users and/or layers in one or more other clusters (e.g., the second cluster) at block 408A. Then equivalent channels to the protected users in the one or more clusters can be calculated at block 410A. User rate for users in the first cluster can be selected accounting for inter-cluster interference at block 412A. For example, MCS can be selected for each user in the first cluster based on effective SINR per UE taking into account inter-cluster interference.

Precoder coefficients (e.g., RZF precoder coefficients) can be calculated for the second cluster with nulling based on selected users in the second cluster and protected users and/or layers in one or more other clusters (e.g., the first cluster) at block 408B. Then equivalent channels to the protected users in the one or more clusters can be calculated at block 410B. User rate for users in the second cluster can be selected accounting for inter-cluster interference at block 412B. For example, MCS can be selected for each user in the second cluster based on effective SINR per UE taking into account inter-cluster interference.

Figure 9:
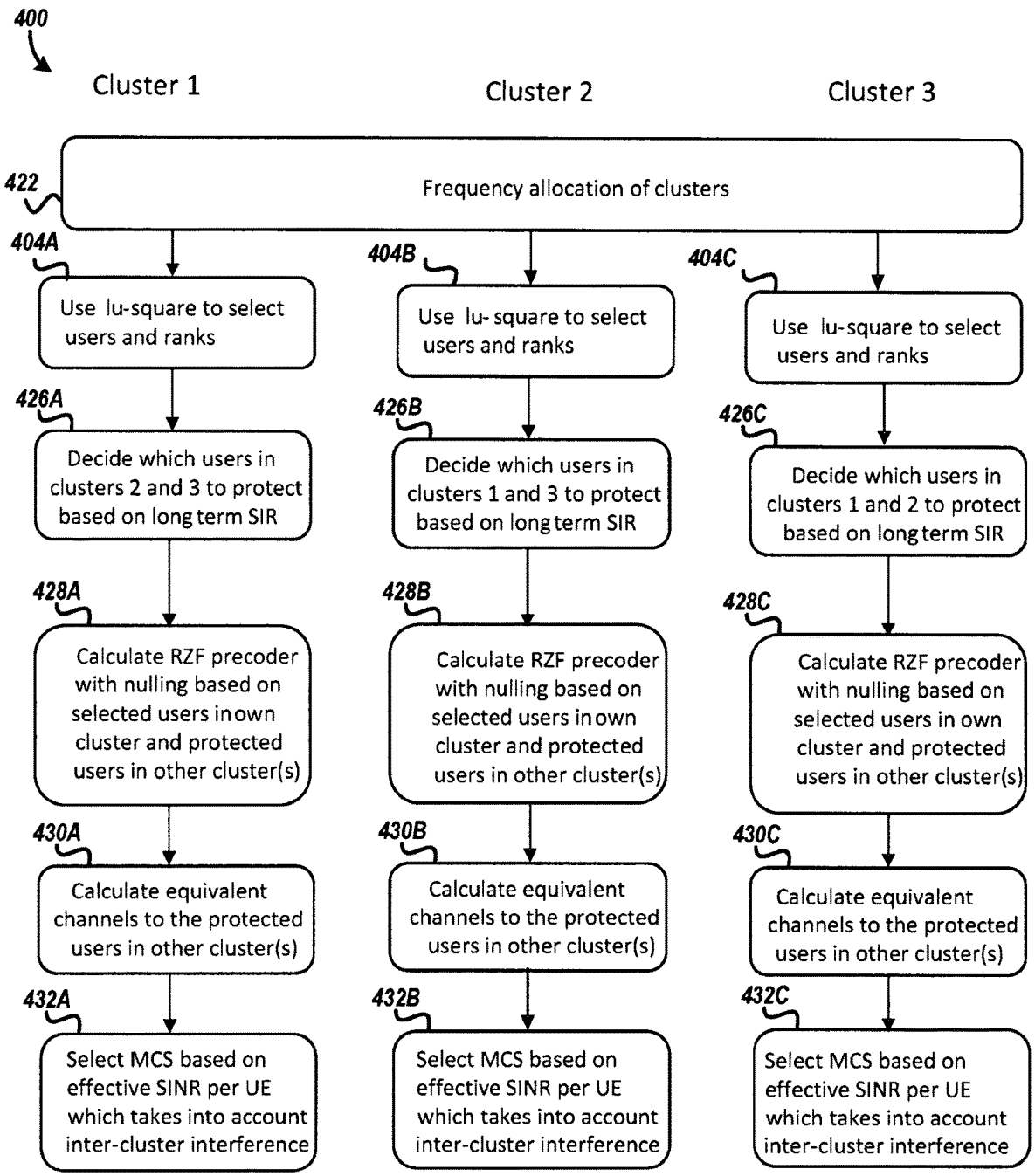
FIG. 9 is a flow diagram of an example method of multi-cluster user rate selection according to another embodiment.

FIG. 9 is a flow diagram of an example method 420 of multi-cluster user rate selection according to an embodiment. The method 420 can be performed at block 104 of the method 100 of FIG. 1A, for example. In the method 420, a plurality of other clusters can be considered when determining protected users and/or layers. Two other clusters can also be considered for nulling and/or accounting for inter-cluster interference. Any suitable principles and advantages discussed above for multi-cluster rate selection can be applied to multi-cluster rate selection with three or more clusters.

Frequency can be allocated for three clusters at block 422. User and rank selection can be performed per cluster at blocks 404A, 404B, and 404C. Lu-square can be used to select users and ranks at blocks 404A, 404B, and 404C.

Users and/or layers from a plurality of clusters to protect from another cluster can be determined. Which users and/or layers to protect can be determined based on a long-term signal interference ratio (SIR), such as SIRN and/or SINR. At block 426A, which users and/or layers to protect in the second and third clusters from the first cluster can be determined. Similarly, which users and/or layers to protect in the first and third clusters from the second cluster can be determined at block 426B. Users and/or layers to protect in the first and second clusters from the third cluster can be determined at block 426C.

Precoder coefficients (e.g., RZF precoder coefficients) can be calculated for a cluster with nulling based on selected users in the cluster and protected users and/or layers in one or more other at blocks 428A, 428B, 428C. Equivalent channels to the protected users in the other clusters can be calculated at blocks 430A, 430B, 430C. User rate for users in a cluster can be selected accounting for inter-cluster interference at blocks 432A, 432B, 432C. For example, MCS can be selected for each user in the cluster based on effective SINR per UE taking into account inter-cluster interference.

Although some in some descriptions, nulling is considered in terms of layers (e.g., determining which layers to protect), any suitable principles and advantages of nulling disclosed herein can be applied to scenarios where nulling is considered in terms of users (e.g., determining which users to protect). When nulling is applied per user, the number of layers to protect per user can be pre-determined.

Long Term Received Signal Indication

Clustering and user rate selection methods can involve an association of a UE with a best serving RRU. The best serving RRU can have the largest received signal power at the UE. The best serving RRU can be referred to as a SAS RRU. The largest received signal power at the UE in a traditional cell layout can be known as downlink (DL) Reference Signal Received Power (RSRP). DL RSRP can be measured at the UE from a DL reference signal (RS). Examples of DL RS include CRS in LTE, SSS in NR, and CSI-RS in NR.

In a distributed MIMO system, a common RS may be jointly transmitted or broadcast by all active RRUs. In such a case, it can be difficult to determine RSRP between a UE and a particular RRU from SSS. For CSI-RS, it is possible to determine RSRP between an RRU and a particular UE if each RRU transmits a unique CSI-RS. As a consequence, the number of CSI-RS resources can scale with the number of RRUs in the deployment. However, this may not be a scalable solution because the number of CSI-RS resources that a UE supports is a UE capability and the UE can be configured with CSI-RS resources for multiple purposes (e.g., beam management, CSI reporting, tracking).

A technical solution is to determine long term RSRP between a UE and RRU from Sounding Reference Signal (SRS) measurements. The technical solution can be implemented with any of the clustering and/or rate selection methods disclosed herein.

Figure 10:
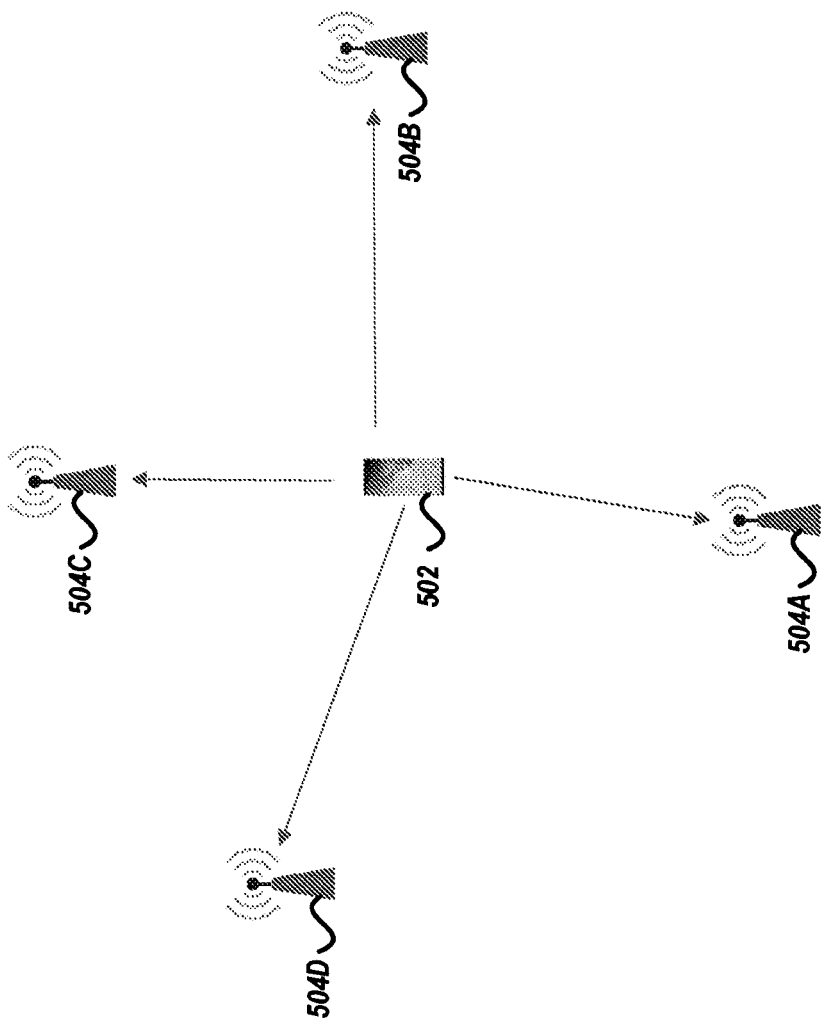
FIG. 10 is a schematic diagram of a user equipment that transits a reference signal to a plurality of remote radio units.

As shown in FIG. 10, a UE 502 can transmit a SRS that is received at each RRU 504A, 504B, 504C, 504D. A 1-port SRS transmission from a UE can be utilized. Alternatively, a multi-port SRS transmission from a UE can be utilized. Long term RSRP can be computed from SRS transmission.

For antenna j on RRU b, and antenna i on UE j, a representative SRS channel estimate at a frequency domain resource element (RE) $k_n$ can be selected from a set of contiguous SRS REs where the size of the set is at least 1. The number of SRS REs used for the computing RSRP is M. Instantaneous uplink (UL) RSRP between UE u and RRU b at SRS occasion t can be represented by the following equation:

$$P_{b,u}(t) = \frac{1}{M \cdot N_r} \sum_j \sum_{n=1}^{M} |\hat{H}_{b_j,u_i}(k_n)|^2.$$

Figure 11:
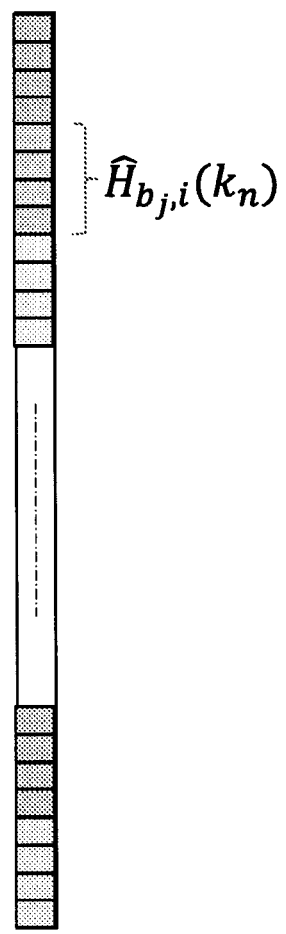
FIG. 11 is a diagram related to calculating long term Reference Signal Received Power.

In this equation $N_r$ is a number of antennas at RRU b. Long term RSRP can be obtained by filtering to average out small scale channel fades: $\bar{P}_{b,u}(t) = \beta \bar{P}_{b,u}(t-1) + (1-\beta)P_{b,u}(t)$, in which $\beta$ is a forgetting factor selected to satisfy a desired averaging length. FIG. 11 is a diagram related to long term RSRP calculation. $\hat{H}_{b_j,u_i}(k_n)$ is denoted in FIG. 11.

In another embodiment, the instantaneous RSRP can be calculated based on time domain channel estimates. The time domain channel estimate for antenna j on RRU b, and antenna i on UE j can be $\tilde{h}_{b_j,u_i}(l)$. The instantaneous uplink (UL) RSRP between UE u and RRU b at SRS occasion t can be represented by the following equation:

$$P_{b,u}(t) = \Sigma_j \Sigma_{l=1}^{L} |\tilde{h}_{b_j,u_i}(l)|^2.$$

Network Systems

A network system can be configured to perform clustering and/or user rate selection in accordance with any suitable principles and advantages disclosed herein. The network system can schedule wireless communications between UEs and network nodes, such as RRUs. The network system can cause downlink wireless transmissions from network nodes to UEs based on clustering and/or rate selection. The network system can exchange MIMO information with UEs. The MIMO information can be exchanged using time division duplex (TDD) MIMO communications in some embodiments.

Network systems can include network nodes (e.g., RRUs) and one or more processing units. The one or more processing units can include any suitable physical hardware to perform any of the methods disclosed herein. For example, the one or more processing units can each include at least one processor and store instructions that when executed by the processor cause a method in accordance with any suitable principles and advantages disclosed herein to be performed. The one or more processors can manage communications between the network system and UEs and/or network nodes. For example, the one or more processors can schedule traffic and cause control information to be sent to UEs. The one or more processors can include a processor configured with specific executable instructions, a microprocessor, a microcontroller, a digital signal processor (DSP), an application specific integrated circuit (ASIC), a programmable logic device such as field programmable gate array (FPGA), the like, or any combination thereof designed to perform any suitable combination of the functions described herein. The one or more processors can be implemented by any suitable combination of computing devices and/or discrete processing circuits in certain applications. The one or more processing units can be programmed to perform a method with any suitable combination of features disclosed herein. The one or more processing units can perform baseband processing. Such processing units can be referred to as baseband processing units. The one or more processing units can include one or more DUs.

Examples diagrams of parts of network systems will be described with reference to FIGS. 12 to 14. These network systems include one or more DUs that can implement any suitable features of a DU defined by a NR specification. Any suitable combination of features of the DUs of FIGS. 12 to 14 can be implemented together with each other. These network systems can operate in any suitable number environment, such as the example network environment 110 of FIG. 1B. The network system can include a plurality or RRUs having antennas for wireless communication with UEs. The network system can implement any suitable clustering and/or user rate selection algorithms disclosed herein.

Figure 12:
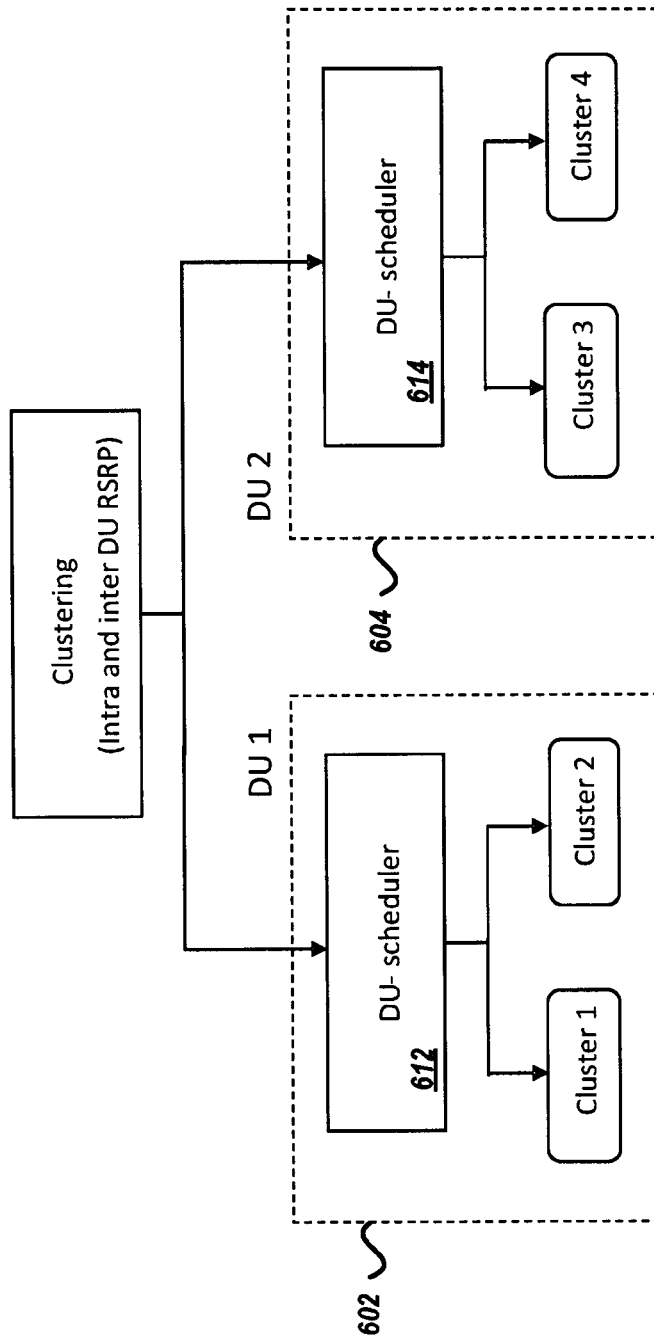
FIG. 12 is a schematic block diagram illustrating part of a network system for clustering according to an embodiment.

FIG. 12 is a schematic block diagram illustrating part of a network system for clustering. A first DU 602 and a second DU 604 can perform clustering in accordance with any suitable principles and advantages disclosed herein. The first DU 602 includes a DU scheduler 612 configured to form a first cluster and a second cluster. The first DU 602 can be in communication with RRUs of the first and second clusters. The second DU 604 includes a DU scheduler 614 configured to form a third cluster and a fourth cluster. The second DU 604 can be in communication with RRUs of the third and fourth clusters. The first DU 602 and the second DU 604 can exchange inter DU RSRP and/or other inter DU information. Accordingly, the DU schedulers 612 and 614 can perform clustering with intra and inter DU RSRP. When there are a relatively large number of RRUs, two or more DUs can implement clustering.

Figure 13:
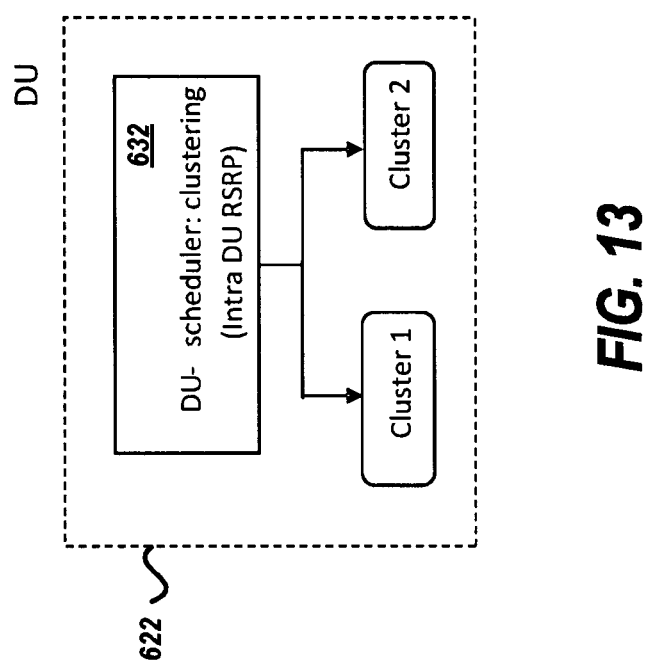
FIG. 13 is a schematic block diagram illustrating part of a network system for clustering according to another embodiment.

FIG. 13 is a schematic block diagram illustrating part of a network system for clustering. In FIG. 13, clustering is implemented by a single DU. A DU 622 can perform clustering in accordance with any suitable principles and advantages disclosed herein. The DU 622 includes a DU scheduler 632 configured to form a first cluster and a second cluster. The DU scheduler 632 can perform clustering with intra DU RSRP.

Figure 14:
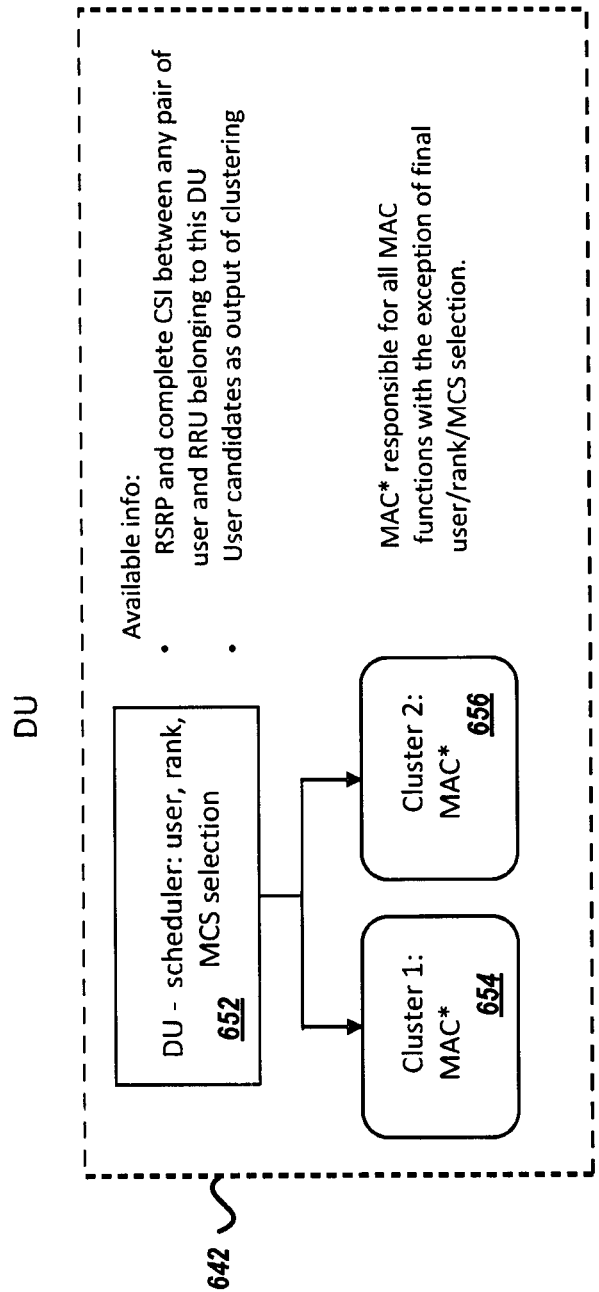
FIG. 14 is a schematic block diagram illustrating part of a network system for user rate selection according to an embodiment.

FIG. 14 is a schematic block diagram illustrating part of a network system for user rate selection. A DU 642 can perform user rate selection in accordance with any suitable principles and advantages disclosed herein. The DU 642 includes a DU scheduler 652 can select users, user rank, and user rate (e.g., MCS). For performing user rate selection, the DU scheduler 652 can have (a) RSRP and channel state information (CSI) between RRU and UE pairs associated with the DU 642 and (b) user candidates generated by clustering. The DU 642 can include media access control (MAC) blocks 654 and 656. Each MAC block 654, 656 can control MAC functions for a respective cluster with the exception of the user rate selection features performed by the DU scheduler 652 (e.g., user selection, user rank, user rate).

Terminology and Conclusion

Depending on the embodiment, certain acts, events, or functions of any of the processes or algorithms described herein can be performed in a different sequence, can be added, merged, or left out altogether (e.g., not all described operations or events are necessary for the practice of the process or algorithm). Moreover, in certain embodiments, operations, or events can be performed concurrently, e.g., through multi-threaded processing, interrupt processing, or multiple processors or processor cores or on other parallel architectures, rather than sequentially. Any suitable combination of parallel and/or sequential execution of a method disclosed herein can be performed.

Conditional language used herein, such as, among others, "can," "could," "might," "may," "e.g.," "such as," and the like, unless specifically stated otherwise, or otherwise understood within the context as used, is generally intended to convey that certain embodiments include, while other embodiments do not include, certain features, elements, and/or operations. Thus, such conditional language is not generally intended to imply that features, elements, and/or operations are in any way required for one or more embodiments or that one or more embodiments necessarily include logic for deciding, with or without other input or prompting, whether these features, elements, and/or steps are included or are to be performed in any particular embodiment. The terms "comprising," "including," and the like are synonymous and are used inclusively, in an open-ended fashion, and do not exclude additional elements, features, acts, operations, and so forth. Additionally, the words "herein," "above," "below," and words of similar import, when used in this application, shall refer to this application as a whole and not to any particular portions of this application. Where the context permits, words in the above Detailed Description of Certain Embodiments using the singular or plural may also include the plural or singular, respectively. Also, the term "or" is used in its inclusive sense (and not in its exclusive sense) so that when used, for example, to connect a list of elements, the term "or" means one, some, or all of the elements in the list.

Disjunctive language such as the phrase "at least one of X, Y, Z," unless specifically stated otherwise, is otherwise understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Unless otherwise explicitly stated or generally understood from context, articles such as "a" or "an" should generally be interpreted to include one or more described items. Accordingly, phrases such as "a device configured to" are intended to include one or more recited devices. Such one or more recited devices can also be collectively configured to carry out the stated recitations. For example, "a processor configured to carry out recitations A, B and C" can include a first processor configured to carry out recitation A working in conjunction with a second processor configured to carry out recitations B and C.

The word "coupled," as generally used herein, refers to two or more elements that may be either directly coupled to each other, or coupled by way of one or more intermediate elements. Likewise, the word "connected," as generally used herein, refers to two or more elements that may be either directly connected, or connected by way of one or more intermediate elements. Connections can be via an air interface and/or via wires and/or via optical fiber and/or via any other suitable connection.

As used herein, the terms "determine" or "determining" encompass a wide variety of actions. For example, "determining" may include calculating, computing, processing, deriving, generating, obtaining, looking up (e.g., looking up in a table, a database or another data structure), ascertaining and the like via a hardware element without user intervention. Also, "determining" may include receiving (e.g., receiving information), accessing (e.g., accessing data in a memory) and the like via a hardware element without user intervention. Also, "determining" may include resolving, selecting, choosing, establishing, and the like via a hardware element without user intervention.

While the above detailed description has shown, described, and pointed out novel features as applied to various embodiments, it can be understood that various omissions, substitutions, and changes in the form and details of the devices or algorithms illustrated can be made without departing from the spirit of the disclosure. For example, circuit blocks and/or method blocks described herein may be deleted, moved, added, subdivided, combined, arranged in a different order, and/or modified. Each of these blocks may be implemented in a variety of different ways. Any portion of any of the methods disclosed herein can be performed in association with specific instructions stored on a non-transitory computer readable storage medium being executed by one or more processors. As can be recognized, certain embodiments described herein can be embodied within a form that does not provide all of the features and benefits set forth herein, as some features can be used or practiced separately from others. The scope of certain embodiments disclosed herein is indicated by the appended claims rather than by the foregoing description. All changes which come within the meaning and range of equivalency of the claims are to be embraced within their scope.

What is claimed is:

1. A method of interference aware clustering, the method comprising:
    forming a first cluster of first user equipments and first network nodes in a first section during a time slot;
    identifying one or more dominant interfering nodes for the first user equipments in the time slot, wherein the one or more dominant interfering nodes are in a second section;
    forming a second cluster of second user equipments and second network nodes in the second section during the time slot that excludes the one or more dominant interfering nodes such that the first user equipments are protected from interference associated with the second cluster, wherein the first section has higher priority than the second section in the time slot; and
    causing multiple-input multiple-output wireless communications during the time slot (a) from the first network nodes to the first user equipments and (b) from the second network nodes to the second user equipments.

2. The method of claim 1, wherein the first network nodes comprise first remote radio units, and the second network nodes comprise second remote radio units.

3. The method of claim 1, wherein the forming the second cluster comprises excluding one or more victim user equipments in the second section from the second cluster.

4. The method of claim 1, wherein the forming the first cluster comprises sorting the first user equipments by user equipment priority and selecting a network node to serve the highest priority user equipment of the first user equipments first.

5. The method of claim 1, further comprising determining (i) a network node of the first network nodes with a highest channel quality measure for each of the first user equipments and (ii) one or more other network nodes of the first network nodes with a channel quality measure within a threshold of the highest channel quality measure for each of the first user equipments, wherein the forming the first cluster is based on the determining.

6. The method of claim 5, further comprising:
    estimating a Sounding Reference Signal channel estimate between an antenna of a user equipment of the first user equipments and an antenna of a network node of the first network nodes; and
    computing an average of squared channel estimates of all antennas of the first network nodes and the antenna of the user equipment of the first user equipments, wherein the determining is based on the computing.

7. The method of claim 1, wherein the forming the first cluster comprises selecting a particular network node of the first network nodes to serve a user equipment of the first user equipments based on (i) a network node of the first network nodes with a highest channel quality measure for the user equipment being unavailable and (ii) the particular network node having a channel quality measure within a threshold of the highest channel quality measure.

8. The method of claim 1, wherein the forming the first cluster comprises determining to stop forming the first cluster in response to a maximum number of user equipments being in the first user equipments.

9. The method of claim 1, wherein the forming the first cluster comprises determining to stop forming the first cluster in response to no more network nodes in the first section being available for scheduling.

10. The method of claim 1, further comprising forming clusters of user equipments and network nodes during a second time slot such that a cluster for the second section is protected from interference associated with a cluster for the first section, wherein the second section has higher priority than the first section in the second time slot.

11. The method of claim 1, further comprising:
    ordering a candidate layer set of layers for the first cluster;
    selecting a layer of the candidate set that satisfies one or more conditions;
    comparing a first sum rate of a selected layer set with a second sum rate of the layer together with the selected layer set;
    based on the comparing, determining to include the layer in the selected layer set; and
    performing rate selection for the first user equipments of the first cluster based on the selected layer set.

12. The method of claim 1, further comprising:
    selecting first ranks associated with the first user equipments;
    selecting second ranks associated with the second user equipments;
    determining one or more user equipments of the first user equipments to protect;
    computing precoding coefficients for the second cluster with nulling based on the second user equipments and the one or more user equipments of the first user equipments to protect; and
    causing wireless transmission from the second network nodes to the second user equipments using the precoding coefficients.

13. The method of claim 1, wherein the multiple-input multiple-output wireless communications are time division duplex multiple-input multiple-output wireless communications.

14. One or more baseband processing units comprising:
memory storing instructions; and
one or more processors configured to execute the instructions to perform the method of claim 1.

15. A method of interference aware clustering, the method comprising:
forming a first cluster of first user equipments and first network nodes in a first section for a time slot;
forming a second cluster of second user equipments and second network nodes in a second section for the time slot with integrated nulling, wherein the first section has higher priority than the second section in the time slot, and wherein the integrated nulling comprises assigning one or more dimensions in the second cluster for nulling to one or more victims of the first user equipments in the first cluster to reduce inter-cluster interference during the time slot; and
causing multiple-input multiple-output wireless communications during the time slot (a) from the first network nodes to the first user equipments and (b) from the second network nodes to the second user equipments.

16. One or more baseband processing units comprising:
memory storing instructions; and
one or more processors configured to execute the instructions to perform the method of claim 15.

17. A network system with interference aware clustering, the network system comprising:
network nodes configured to wirelessly exchange information with user equipments, the network nodes comprising first network nodes in a first section and second network nodes in a second section; and
one or more baseband processing units in communication with the network nodes, the one or more baseband processing unit programmed to at least:
form a first cluster of a first group of the user equipments and the first network nodes during a time slot;
form a second cluster of a second group of the user equipments and the second network nodes during the time slot such that the first group of the user equipments are protected from interference associated with the second cluster, wherein the second cluster does not include one more dominant interfering nodes in the second section and/or one or more dimensions in the second cluster are assigned for integrated nulling to one or more victims of the first group of user equipments, and wherein the first section has higher priority than the second section in the time slot; and
cause multiple-input multiple-output wireless communications during the time slot (a) from the first network nodes to the first group of the user equipments and (b) from the second network nodes to the second group of the user equipments.

18. The network system of claim 17, wherein the network nodes comprise remote radio units.

19. The network system of claim 17, wherein the one or more baseband processing units comprise a distributed unit in accordance with a New Radio standard.

20. The network system of claim 17, wherein the one or more baseband processing units are programmed to exclude one or more dominant interfering network nodes in the second section from the second group of the user equipments in forming the second cluster.

21. The network system of claim 17, wherein the one or more baseband processing units are programmed to exclude one or more victim user equipments in the second section from the second group of the user equipments in forming the second cluster.

22. The network system of claim 17, wherein the one or more baseband processing units are further programmed to assign one or more dimensions in the second cluster for nulling to one or more victims of the first group of the user equipments in the first cluster to reduce inter-cluster interference.

* * * * *